US010152400B2

(12) United States Patent
Kotikalapudi et al.

(10) Patent No.: US 10,152,400 B2
(45) Date of Patent: Dec. 11, 2018

(54) METHOD AND SYSTEM FOR DYNAMICALLY UNBLOCKING CUSTOMERS IN CRITICAL WORKFLOWS BY PUSHING COMMUNITY CONTRIBUTED SOLUTIONS JUST-IN-TIME WHEN AN ERROR IS ENCOUNTERED

(71) Applicant: Intuit Inc., Mountain View, CA (US)

(72) Inventors: Prabhakar Srinivas Kotikalapudi, Bangalore (IN); Sunil Kumar Alachi, Kannur (IN); Vatsal Singh, Bangalore (IN)

(73) Assignee: Intuit Inc., Mountain View, CA (US)

( * ) Notice: Subject to any disclaimer, the term of this patent is extended or adjusted under 35 U.S.C. 154(b) by 83 days.

(21) Appl. No.: 14/948,650

(22) Filed: Nov. 23, 2015

(65) Prior Publication Data

US 2017/0102989 A1  Apr. 13, 2017

(30) Foreign Application Priority Data

Oct. 9, 2015 (IN) .......................... 1072/KOL/2015

(51) Int. Cl.
| | |
|---|---|
| G06F 11/00 | (2006.01) |
| G06F 11/22 | (2006.01) |
| G06F 11/07 | (2006.01) |
| G06Q 10/00 | (2012.01) |
| G05B 23/02 | (2006.01) |

(52) U.S. Cl.
CPC ...... *G06F 11/2257* (2013.01); *G06F 11/0709* (2013.01); *G06F 11/0793* (2013.01); *G06F 11/2268* (2013.01); *G05B 23/0229* (2013.01); *G06Q 10/20* (2013.01)

(58) Field of Classification Search
CPC ............ G06F 11/0709; G06F 11/0781; G06F 11/0793; G06F 11/2257; G06F 11/2268; G05B 23/0227; G05B 23/0229; G06Q 10/103; G06Q 10/20; G06Q 30/0282; G06Q 50/01; H04L 41/5074
See application file for complete search history.

(56) References Cited

U.S. PATENT DOCUMENTS

| | | |
|---|---|---|
| 7,184,967 B1 | 2/2007 | Mital et al. |
| 8,108,878 B1 | 1/2012 | Pulsipher |
| 9,183,092 B1 | 11/2015 | Marr et al. |

(Continued)

*Primary Examiner* — Gabriel L Chu
(74) *Attorney, Agent, or Firm* — Hawley Troxell Ennis & Hawley LLP; Philip McKay

(57) ABSTRACT

Error occurrence/recurrence rates from multiple users of a software system are monitored. In one embodiment, log error data and context data associated with a critical issue is provided to a server side repository. When it is detected that a threshold number of users of a software application are facing the same critical issue a community portal is updated with a facility for users to post their solutions, i.e., workarounds, and/or observations, and/or comments, associated with the specific critical issue/error. In one embodiment, the posted solutions are rated and/or monitored, and if the rating for a given solution receives a rating above a threshold rating value, then data suggesting the solution, and/or implementing the solution, is pushed to users who continue to encounter the same critical issue, in one embodiment, using an action message framework, until a permanent fix is applied.

28 Claims, 4 Drawing Sheets

(56) References Cited

U.S. PATENT DOCUMENTS

| | | | |
|---|---|---|---|
| 2008/0263404 A1* | 10/2008 | Vidiyala | G06F 11/0748 |
| | | | 714/38.14 |
| 2009/0198548 A1 | 8/2009 | Kohler et al. | |
| 2010/0057677 A1* | 3/2010 | Rapp | G06F 9/4446 |
| | | | 707/E17.014 |
| 2010/0199132 A1* | 8/2010 | Compton | G06F 11/0709 |
| | | | 714/57 |
| 2014/0277902 A1* | 9/2014 | Koch | G07C 5/008 |
| | | | 701/29.1 |
| 2014/0289229 A1* | 9/2014 | Gangadharaiah | G06Q 10/101 |
| | | | 707/723 |
| 2014/0337243 A1 | 11/2014 | Dutt et al. | |
| 2014/0380105 A1* | 12/2014 | Michel | G06F 11/0769 |
| | | | 714/57 |
| 2015/0052122 A1* | 2/2015 | Landry | G06F 11/0706 |
| | | | 707/723 |
| 2015/0133076 A1* | 5/2015 | Brough | H04W 24/10 |
| | | | 455/405 |
| 2015/0363741 A1* | 12/2015 | Chandra | G06Q 10/06311 |
| | | | 705/7.17 |
| 2016/0086399 A1* | 3/2016 | Marathe | G08G 1/096716 |
| | | | 340/905 |
| 2016/0239847 A1* | 8/2016 | Arvapally | G06Q 30/016 |

\* cited by examiner

METHOD AND SYSTEM FOR DYNAMICALLY UNBLOCKING CUSTOMERS IN CRITICAL WORKFLOWS BY PUSHING COMMUNITY CONTRIBUTED SOLUTIONS JUST-IN-TIME WHEN AN ERROR IS ENCOUNTERED

BACKGROUND

Software applications and systems have become indispensable tools for helping consumers/users, i.e., users of the software applications, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

More recently there has been an increasing interest in workflow applications as a way of supporting complex processes in modern business and mobile environments. Given the nature of the environment and the technology involved, workflow applications are inherently distributed and pose many challenges to system designers. In most cases, a client/server architecture is used in which knowledge about the processes being executed is centralized in one node to facilitate monitoring, auditing, and to simplify synchronization.

One complicated, unresolved, and long standing technical problem associated with the workflow application environment is that customers, i.e., software application users often find themselves stuck, i.e., blocked from making progress with their workflows, due to system, setup, and data synchronization issues, referred to herein as access and/or critical issues, such as billing, entitlements, permissions, synchronization failures, system bugs, etc. This inevitably results in negative user experiences, customer frustration, and time and productivity loss. This, in turn, leads to loss of business for the software application provider and loss of productivity for the user of the software application. Clearly this is not an ideal situation.

What is needed is a method and system for unblocking customers/users of a software application, in the interim, without the need for applying a data fix or releasing a patch or new application version, until a long-term solution can be formulated and implemented.

SUMMARY

Embodiments of the present disclosure provide a technical solution to the long standing technical problem in the workflow application environment of users of a software application getting stuck and blocked from making progress with their workflows due to access and/critical issues such as system, setup, permissions, and data synchronization issues, without applying a data fix or releasing a patch or new application version, until a long-term solution can be formulated and implemented.

In accordance with one embodiment, error occurrence/recurrence rates associated with critical issue reports from multiple users of a software system are monitored. In one embodiment, log error data and context data associated with the critical issue is provided to a server side repository. In one embodiment, when it is detected that a threshold number of users of a software application are facing a given critical issue, such as blocking of data access in a defined context, i.e., a threshold recurrence of the same log error data and context data is detected, a community portal is updated with a facility for users to post their solutions, i.e., workarounds, and/or observations, and/or comments, associated with the specific critical issue/error. In one embodiment, the posted solutions are rated and/or monitored, and if the rating(s) for a given solution are above a threshold rating value, then data representing the solution, and/or implementing the solution, is pushed to users who continue to encounter the same critical issue, in one embodiment, using an action message framework, until a permanent fix is applied.

In accordance with one embodiment, a software application is provided to one or more users using one or more computing systems. In one embodiment, a message based action system associated with the software application is provided for providing action messages through the software application to user computing systems implementing at least part of the software application.

In one embodiment, a community portal for the software application is provided through which recurring error solution data representing solutions to recurring errors encountered by users of the software application is obtained and/or posted. In one embodiment, threshold error occurrence rate data is generated representing a threshold error occurrence rate such that if an error occurs more than the threshold error occurrence rate, the error is designated a recurring error. In one embodiment, the community portal for the software application is then updated to allow recurring error solution data representing solutions to the recurring error to be obtained and/or posted.

In one embodiment, a recurring error solutions ratings system is provided through which the recurring error solution data representing solutions to recurring errors obtained and/or posted in the community portal for the software application are rated and associated recurring error solution ratings data is generated. In one embodiment, the threshold recurring error solution ratings data is generated representing a defined threshold recurring error solution rating such that if recurring error solution data representing a solution to a recurring error obtained and/or posted in the community portal for the software application has associated recurring error solution ratings data representing a recurring error solution rating for the recurring error solution data greater than the threshold recurring error solution rating represented by the threshold recurring error solution ratings data, the recurring error solution data is designated well rated recurring error solution data representing a well rated solution to the recurring error.

In one embodiment, all well rated recurring error solution data is categorized according to log error data and context data associated with the recurring error that is the subject of the well rated recurring error solution data. In one embodiment, categorized well rated recurring error solution data is thereby generated. In one embodiment, the categorized well rated recurring error solution data is stored.

In one embodiment, when a user encounters an access blockage or other critical issue, user critical issue report data is received from the user, and/or a user computing system implementing the software application, indicating the user has encountered an access issue or other critical issue. In one embodiment, user log error data and user context data associated with the user critical issue is obtained and logged from the user computing system associated with the user of the software application. In one embodiment, the user log error data and user context data is provided to a log error data and context data tracking database. In one embodiment, the obtained user log error data and user context data is analyzed to determine if the obtained user log error data and user context data matches the error data and context data associated with any of the categorized well rated recurring error solution data representing well rated solutions to recurring errors.

In one embodiment, if the obtained user log error data and user context data is determined to match the error data and context data associated with a given well rated solution to the recurring error, represented by a relevant portion of the categorized well rated recurring error solution data, an action message is generated and transmitted to the user computing system through the message based action system associated with the software application. In one embodiment, the action message provides the user access to the relevant portion of the categorized well rated recurring error solution data representing the solution to the matched user log error data and user context data of the user critical issue report data.

In one embodiment, the well rated recurring error solution matching the user log error data and user context data of the user critical issue report data is then implemented on the user computing system using the transmitted relevant portion of the categorized well rated recurring error solution data, through the software application itself.

In one embodiment, if the obtained user log error data and user context data is determined not to match the error data and context data associated with any well rated solution to the recurring error of the categorized well rated recurring error solution data, an error solution and matching service is used to dynamically generate new recurring error solution data representing a solution to the error indicated in the obtained user log error data and user context data associated with the user critical issue report data. In one embodiment, an action message is then transmitted to the user computing system through the message based action system associated with the software application providing the user access to the new recurring error solution data representing a solution to the error indicated in the obtained user log error data and user context data associated with the user critical issue report data. In one embodiment, the new recurring error solution data representing a solution to the error indicated in the obtained user log error data and user context data associated with the user critical issue report data is then implemented on the user computing system.

In one embodiment, the new recurring error solution data representing a solution to the error indicated in the obtained user log error data and user context data associated with the user critical issue report data is then classified according to the user log error data and user context data associated with the user critical issue report data to generate categorized new recurring error solution data. In one embodiment, the categorized new recurring error solution data is then stored for further use when other users encounter the error indicated in the obtained user log error data and user context data associated with the user critical issue report data.

The disclosed method and system for dynamically unblocking customers in critical workflows by pushing community contributed solutions just-in-time when an error is encountered provides the ability to message a specific user, or group of users, based on specific condition(s) checks. In addition, the disclosed method and system for dynamically unblocking customers in critical workflows by pushing community contributed solutions just-in-time when an error is encountered provides the ability to trigger upgrade flow when a specific condition is met.

The disclosed method and system for dynamically unblocking customers in critical workflows by pushing community contributed solutions just-in-time when an error is encountered provides the ability to send messages through notifications/action messages to trigger actions based on a condition. In addition, the disclosed method and system for dynamically unblocking customers in critical workflows by pushing community contributed solutions just-in-time when an error is encountered provides the ability to detect a specific error scenario and request the user to send the error log data and/or context data, or automatically obtain the error log data and/or context data, to help in the investigation of the error/critical issue.

The disclosed method and system for dynamically unblocking customers in critical workflows by pushing community contributed solutions just-in-time when an error is encountered provides the ability to turn on enhanced logging for a specific customer, normally after user permission is obtained, to debug a critical issue/error. In addition, the disclosed method and system for dynamically unblocking customers in critical workflows by pushing community contributed solutions just-in-time when an error is encountered provides the ability to turn on enhanced logging for a specific set, class, or group of users, with the user's permission, to debug an issue.

In addition, the disclosed method and system for dynamically unblocking customers in critical workflows by pushing community contributed solutions just-in-time when an error is encountered provides for a generic expression evaluator that can unblock customers and open up possibilities to dynamically control errors/software application behavior without a need for a code change.

The disclosed method and system for dynamically unblocking customers in critical workflows by pushing community contributed solutions just-in-time when an error is encountered provides for unblocking customers/users of a software application without the need for applying a data fix or releasing a patch or a new application version until a long-term solution can be formulated and implemented. Therefore the disclosed method and system for dynamically unblocking customers in critical workflows by pushing community contributed solutions just-in-time when an error is encountered solves the long standing technical problem in the workflow application environment of users of a software application getting stuck and blocked from making progress with their workflows due to system, setup, data synchronization issues, and/or other critical issues, all without applying a data fix or releasing a patch or new application version.

The disclosed method and system for dynamically unblocking customers in critical workflows by pushing community contributed solutions just-in-time when an error is encountered does not encompass, embody, or preclude other forms of innovation in the area of workflow applications. In addition, the disclosed method and system for dynamically unblocking customers in critical workflows by pushing community contributed solutions just-in-time when an error is encountered is not related to fundamental economic practice, data processing practice, mental steps, or pen and paper based solutions, and is in fact directed to providing solutions to the relatively new problems associated with distributed workflow applications. Consequently, the disclosed method and system for dynamically unblocking customers in critical workflows by pushing community contributed solutions just-in-time when an error is encountered is not directed to, does not encompass, and is not merely, an abstract idea or concept.

In addition, the disclosed method and system for dynamically unblocking customers in critical workflows by pushing community contributed solutions just-in-time when an error is encountered provides for significant improvements to the technical fields of customer support, information dissemination, software implementation, user experience, data processing, data management, distributed workflow applications, client server applications, and real time application fixes.

In addition the disclosed method and system for dynamically unblocking customers in critical workflows by pushing community contributed solutions just-in-time when an error is encountered provides for the processing of only relevant portions of data and data analysis before the data is further analyzed, processed, and/or transmitted/distributed. Consequently, using the disclosed method and system for dynamically unblocking customers in critical workflows by pushing community contributed solutions just-in-time when an error is encountered results in more efficient use of human and non-human resources, fewer processor cycles being utilized, reduced memory utilization, and less communications bandwidth being utilized to relay data to and from backend systems and client systems. As a result, computing systems are transformed into faster, more efficient, and more effective computing systems by implementing the method and system for dynamically unblocking customers in critical workflows by pushing community contributed solutions just-in-time when an error is encountered.

Figure 1:
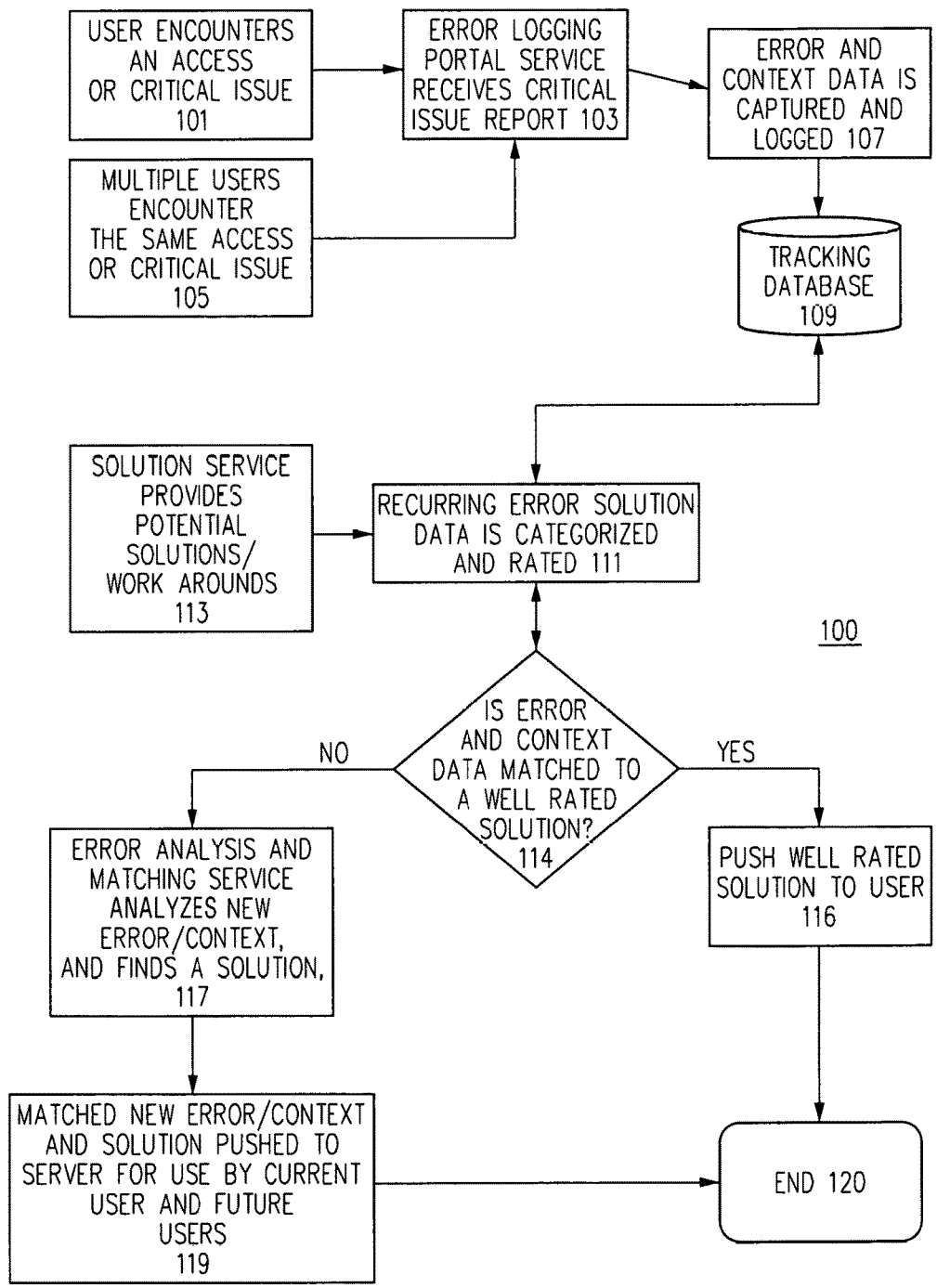
FIG. 1 shows a generalized and high level operational flow of a method and system for dynamically unblocking customers in critical workflows by pushing community contributed solutions just-in-time when an error is encountered, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

Term Definitions

Herein, the terms "software system" and "software application" are used interchangeably and can be, but are not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the terms "software system" and "software application" include, but are not limited to the following: computing system implemented, and/or online, and/or web-based, personal and/or business tax preparation systems, services, packages, programs, modules, or applications; computing system implemented, and/or online, and/or web-based, personal and/or business financial management systems, services, packages, programs, modules, or applications; computing system implemented, and/or online, and/ or web-based, personal and/or business management systems, services, packages, programs, modules, or applications; computing system implemented, and/or online, and/or web-based, personal and/or business accounting and/ or invoicing systems, services, packages, programs, modules, or applications; and various other personal and/or business electronic data management systems, services, packages, programs, modules, or applications, whether known at the time of filling or as developed later.

Specific examples of "software systems" and "software applications" include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™ available from Intuit, Inc. of Mountain View, Calif.; QuickBooks™, available from Intuit, Inc. of Mountain View, Calif.; Quick-Books Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network;

a satellite network; a cable network; any combination of different network types; or any other system capable of allowing communication between two or more assets, virtual assets, and/or computing systems, whether available or known at the time of filing or as later developed.

As used herein, the term "user experience" includes not only the data entry and question submission process, but also other user experience features provided or displayed to the user such as, but not limited to the following: interfaces; images; backgrounds; avatars; highlighting mechanisms; icons; and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the method and system for dynamically unblocking customers in critical workflows by pushing community contributed solutions just-in-time when an error is encountered described herein, and/or a person and/or entity that interfaces with, and/or to whom information is provided by, the method and system for dynamically unblocking customers in critical workflows by pushing community contributed solutions just-in-time when an error is encountered described herein, and/or a legal guardian of person and/or entity that interfaces with, and/or to whom information is provided by, the method and system for dynamically unblocking customers in critical workflows by pushing community contributed solutions just-in-time when an error is encountered described herein, and/or an authorized agent of any party and/or person and/or entity that interfaces with, and/or to whom information is provided by, the method and system for dynamically unblocking customers in critical workflows by pushing community contributed solutions just-in-time when an error is encountered described herein. For instance, in various embodiments, a user can be, but is not limited to, a person, a commercial entity, an application, a service, and/or a computing system.

As used herein, the term "action message" includes messages used to send customized notification payloads that cause specific operations or actions to occur when a notification is received or activated and that logically, and operationally, connect what a software application running on user computing systems does, and what operations it performs on user computing systems, with what the application provider/application server sends through the action message.

As used herein, the term "action message system" includes an action message framework that represents and creates a cooperation between a software application user's computing system and the action messages sent to it through the software application. Consequently, as used herein, the terms "action message system" and "action message framework" do not necessarily mean a mobile or server-side technology on its own, but again rather a cooperation between the user device and the action messages sent to it.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Embodiments of the present disclosure provide a technical solution to the long standing technical problem in the workflow application environment of users of a software application getting stuck and blocked from making progress with their workflows due to system setup, data synchronization, or other critical issues, without applying a data fix or releasing a patch or new application version, until a long-term solution can be formulated and implemented.

According to one embodiment, a loosely coupled message based action framework is provided using the method and system for dynamically unblocking customers in critical workflows by pushing community contributed solutions just-in-time when an error is encountered that allows the developers and product managers to dynamically control the software application behavior based on the action messages and message actions defined on the server and these message actions can be targeted to a specific user or a set of users based on the criteria defined on the server. Consequently, using embodiments of the method and system for dynamically unblocking customers in critical workflows by pushing community contributed solutions just-in-time when an error is encountered discussed herein, all critical issues, such as access and blocking issues, can potentially have a work-around automatically provided just in time when the critical issue notification is received through user and community contributed solutions.

In accordance with one embodiment, error occurrence/recurrence rates associated with critical issue reports from multiple users of a software system are monitored. In one embodiment, log error data and context data associated with the critical issue is provided to a server side repository. In one embodiment, when it is detected that a threshold number of users of a software application are facing a given critical issue, such as blocking of data access in a defined context, i.e., a threshold recurrence of the same log error data and context data is detected, a community portal is updated with a facility for users to post their solutions, i.e., workarounds, and/or observations, and/or comments, associated with the specific critical issue/error. In one embodiment, the posted solutions are rated and/or monitored, and if the rating(s) for a given solution are above a threshold rating value, then, in one embodiment, if the obtained user log error data and user context data is determined to match the error data and context data associated with a posted solution having a rating above threshold rating value, data representing the solution, and/or implementing the solution, is pushed to users who continue to encounter the same critical issue, in one embodiment, using an action message framework, until a permanent fix is applied.

In one embodiment, if the obtained user log error data and user context data is determined not to match the error data and context data associated with any well rated solution, an error solution and matching service is used to dynamically generate new recurring error solution data representing a solution to the error indicated in the obtained user log error data and user context data associated with the user critical issue report data. In one embodiment, an action message is then transmitted to the user computing system through the message based action system associated with the software application providing the user access to the new recurring error solution data representing a solution to the error indicated in the obtained user log error data and user context data associated with the user critical issue report data. In one embodiment, the new recurring error solution data representing a solution to the error indicated in the obtained user log error data and user context data associated with the user critical issue report data is then classified according to the user log error data and user context data associated with the user critical issue report data to generate categorized new recurring error solution data. In one embodiment, the categorized new recurring error solution data is then stored for further use when other users encounter the error indicated in the obtained user log error data and user context data associated with the user critical issue report data.

In one embodiment, the community contributed solutions are automatically applied for other errors taking into account implicit user contribution, i.e., by tracking the steps that the user has taken after they encounter the issue and checking if the user workflow was successful or not, and explicit user contribution, i.e., based on the user feedback entered in the community portal.

In one embodiment a software application is provided. As noted above, herein, the term software application includes, but is not limited to the following: computing system implemented, and/or online, and/or web-based, personal and/or business tax preparation systems, services, packages, programs, modules, or applications; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software applications include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software applications discussed herein, and/or known to those of skill in the art at the time of filing, and/or as developed after the time of filing.

In one embodiment, a message based action system associated with the software application is provided using one or more computing systems. As noted above, in one embodiment, the provided message based action system is a loosely coupled message based action framework for dynamically unblocking customers in critical workflows by pushing community contributed solutions just-in-time when an error is encountered that allows the developers and product managers to dynamically control the software application behavior based on the action messages and message actions defined on the server and these message actions can be targeted to a specific user or a set of users based on the criteria defined on the server.

As noted above, as used herein, the term "action message" includes messages used to send customized notification payloads that cause specific operations or actions to occur when a notification is received or activated and that logically, and operationally, connect what the provided software application running on user computing systems does, and what operations it performs on user computing systems, with what the software application provider/software application server sends through the action message.

As also noted above, as used herein, the term "action message system" includes an action message framework that represents and creates a cooperation between the provided software application user's computing system and the action messages sent to the provided software application user's computing system through the software application itself. Consequently, as used herein, the terms "action message system" and "action message framework" do not necessarily mean a mobile or server-side technology on its own, but rather a cooperation between the provided software application user's computing system and the action messages sent to it. Consequently, using an "action message system" the provided software application user's computing system needs to know how to perform tasks indicated in an action message by name, with optional arguments, in certain distinct situations, with an optional result value.

To this end, in one embodiment, each message action of an action message includes at least the following attributes: condition for the action; context; and action. In one embodiment, the condition for the action attribute supports logical expression with the ability to use any exposed variables in the software application such as, but not limited to, companyId, userId, version code, etc., global and context based. In addition, in one embodiment, a variable called "now" that represents the time in milliseconds from Jan. 1, 1970 midnight GMT is also available.

In one embodiment, the context attribute defines the context or placement when/where the message actions will be executed in the software application, such as, but not limited to, when the software application starts, when an error occurs, or during upgrade flow, etc.

In one illustrative embodiment, the available contexts include, but are not limited to, an appstart context, e.g., called very early on in the software application initialization.

In one illustrative embodiment, the available contexts include, but are not limited to, a syncparseerror context, e.g., called when an entity parsing error happens during synchronization. In one embodiment, the syncparseerror context variables available to use include, but are not limited to: syncerrorcode, an error code representing the specific entity parse error; and syncerrorentity, an entity name that has the parse error.

In one illustrative embodiment, the available contexts include, but are not limited to, a syncerror context, e.g., called when a batch request contains a fault item. In one embodiment, this is executed for each fault response item. In one embodiment, syncerror context variables available to use include, but are not limited to: syncerrorcode, the error code from server; and syncerrormessage, the error message from server.

In one illustrative embodiment, the available contexts include, but are not limited to, an activitystart context, e.g., called once for each activity start. As an illustrative example, activity in an Android™ environment corresponds to a new screen/page. In one embodiment, the activitystart context variables available to use include, but are not limited to, activityname, the name of the activity.

In one illustrative embodiment, the available contexts include, but are not limited to, a synccomplete context, e.g., called once the foreground synchronization is completed.

In one illustrative embodiment, the available contexts include, but are not limited to, a homepage context, e.g., called whenever the homepage is shown.

In one illustrative embodiment, the available contexts include, but are not limited to, a new version context, e.g., called the first time a new version is launched.

In one illustrative embodiment, the available contexts include, but are not limited to, an afterupgrade context, e.g., called the first time after an upgraded software application is launched.

In one illustrative embodiment, the available contexts include, but are not limited to, a logerror context, e.g., called when errors are logged. In one embodiment, logerror context variables available to use include, but are not limited to, logmessage, a message that is logged.

In one illustrative embodiment, the available contexts include, but are not limited to, a loginfo context, e.g., called when information is logged. In one embodiment, loginfo context variables available to use include, but are not limited to, logmessage, a message that is logged.

Although specific illustrative examples of contexts are discussed above, those of skill in the art will recognize that different, more, or less, contexts can be defined and implemented using different, similar, or the same nomenclature/symbols and functionality. Consequently, the specific context examples discussed herein are presented as illustrative examples only and do not limit the scope of the claims presented below.

In one embodiment, the actions are predefined actions available in the software application. In one embodiment, actions are identified by name and are registered with the action message system/framework.

In one embodiment, action messages are delivered to the software application user's computing system, i.e., the client, through software application settings. In one embodiment, the key is actionmessages.expr. In one embodiment, each available action includes; 1. A name data field indicating the defined name of the action; 2. A one-time message (otm) data field indicating if the action is executed only once; and 3. An action JSON field indicating any action specific JSON as a string.

As an illustrative example of one embodiment, the actions supported include, but are not limited to, an alert action, e.g., an action that shows an alert dialog with ok and cancel buttons. In one embodiment, the following attributes of the alert can be customized:

a. title—the title for the dialog;
 b. message—the message for the dialog;
 c. okCaption—an ok button caption;
 d. cancelCaption—a cancel button caption;
 e. okAction—the definition of the action that needs to be executed when the user clicks the ok button; and
 f. cancelAction—the definition of the action that needs to be executed when the user clicks the cancel button.

As an illustrative example of one embodiment, the actions supported include, but are not limited to, a fullsync action that triggers a full data synchronization.

As an illustrative example of one embodiment, the actions supported include, but are not limited to, a skipsyncerror action that skips a synchronization (sync) error. In one embodiment, the skipsyncerror action is used for parsing errors.

As an illustrative example of one embodiment, the actions supported include, but are not limited to, an alogsyncerror action that logs sync error details including logging JSON response data.

As an illustrative example of one embodiment, the actions supported include, but are not limited to, a goforupgrade action that takes the user to the software application upgrade flow.

As an illustrative example of one embodiment, the actions supported include, but are not limited to, a dynamic action that dynamically adds an action message to execute at a later time or event.

Although specific illustrative examples of actions are discussed above, those of skill in the art will recognize that different, more, or less, actions can be defined and implemented using different, similar, or the same nomenclature/symbols and functionality. Consequently, the specific action examples discussed herein are presented as illustrative examples only and do not limit the scope of the claims presented below.

Continuing with the specific illustrative example above, one illustrative action message format could be [{context:"AAA",condition:"BBB",actions:[{name:"CCC", otm: True or False, actionJson:NULL or DDD}]}] where: AAA represents the context data; BBB represents the condition data; CCC represents the action; True or False represents True or False; Null represents the null set, or none; and DDD represents the JSON.

As an even more specific illustrative example of one embodiment, a sample message action could be:

[{context:"syncerror", condition:"syncerrorcode=2019", actions:[{name:"skipsyncerror", otm: true, actionJson: null}]}].

This sample message action indicates that its context is "syncerror" meaning it can happen when application synchronization has failed. This sample message action indicates that its condition is"syncerrorcode=2019" meaning the entity having code 2019 has failed to synchronize. Note: the condition is always a logical expression. This sample message action indicates the action "skipsyncerror" meaning there is some code associated with the action "skipsyncerror" which lets the user skip this error and get unblocked. This sample message action indicates the otm field is true, i.e., the action is performed only once. This sample message action indicates the action JSON field is null, meaning there is no action JSON.

Although specific illustrative examples of action messages are discussed above, those of skill in the art will recognize that different action message/message action formats can be defined and implemented using different, similar, or the same nomenclature/symbols and functionality. Consequently, the specific action message/message action format examples discussed herein are presented as illustrative examples only and do not limit the scope of the claims presented below.

In one embodiment, a community portal for the software application is provided using one or more computing systems. In one embodiment, through the community portal, recurring error solution data representing solutions to recurring errors encountered by users of the software application is obtained and/or posted. In one embodiment, the solutions to recurring errors encountered by users of the software application are obtained from a solution service and/or developers and technicians associated with the software application provider.

In one embodiment, the solutions to recurring errors encountered by users of the software application are obtained from the software application users themselves. In one embodiment, the solutions to recurring errors encountered by users of the software application are obtained from the software application users themselves through implicit user contribution, i.e., by tracking the steps that the user has taken after they encounter the issue and checking if the user workflow was successful or not. In one embodiment, the solutions to recurring errors encountered by users of the software application are obtained from the software application users themselves through explicit user contribution, i.e., based on user feedback.

In one embodiment, a threshold error occurrence rate is defined and threshold error occurrence rate data is generated representing the defined threshold error occurrence rate. In one embodiment, the threshold error occurrence rate is defined such that if an error occurs more than the threshold error occurrence rate, the error is designated a recurring error and the community portal for the software application is updated to allow recurring error solution data representing solutions to the recurring error to be obtained and/or posted.

In one embodiment, a recurring error solutions ratings system is provided using one or more computing systems. In one embodiment, through the recurring error solutions ratings system, the recurring error solution data representing solutions to recurring errors obtained and/or posted in the community portal for the software application are rated and associated recurring error solution ratings data is generated. In one embodiment, the recurring error solution data representing solutions to recurring errors obtained and/or posted in the community portal for the software application are rated and associated recurring error solution ratings data is generated based on reviews submitted by the software system users.

In one embodiment, the recurring error solution data representing solutions to recurring errors obtained and/or posted in the community portal for the software application are rated and associated recurring error solution ratings data is generated based on the monitored and logged success rates of solutions to recurring errors implemented on user computing systems. In one embodiment, the success rates of solutions to recurring errors implemented on user computing systems is monitored and logged through implicit user contribution, i.e., by tracking the steps that the user has taken after they encounter the issue and checking if the user workflow was successful or not. In one embodiment, the success rates of solutions to recurring errors implemented on user computing systems is monitored and logged through explicit user contribution, i.e., based on user feedback.

In one embodiment, a threshold recurring error solution rating is defined and threshold recurring error solution rating data representing the defined threshold recurring error solution rating is generated. In one embodiment, the threshold recurring error solution rating is defined such that if recurring error solution data representing a solution to a recurring error obtained and/or posted in the community portal for the software application has associated recurring error solution ratings data representing a recurring error solution rating for the recurring error solution data greater than the threshold recurring error solution rating represented by the threshold recurring error solution ratings data, the recurring error solution data is designated well rated recurring error solution data representing a well rated solution to the recurring error.

In one embodiment, all well rated recurring error solution data is categorized according to error data and context data associated with the recurring error that is the subject of the well rated recurring error solution data to generate categorized well rated recurring error solution data. In one embodiment, the categorized well rated recurring error solution data is stored.

In one embodiment, a user of the software application encounters an access blockage or other critical issue. In one embodiment, user critical issue report data is received from a user of the software application, and/or a user computing system associated with the user of the software application, indicating the user has encountered the access issue or other critical issue.

In one embodiment, user log error data and user context data associated with the user critical issue is obtained and logged from a user computing system associated with the user of the software application. In one embodiment, the user log error data and user context data associated with the user critical issue is obtained using an error logging portal service that captures the user log error data and user context data.

In one embodiment, the user log error data and user context data associated with the user critical issue is obtained and logged from a user computing system associated with the user of the software application via implicit user contribution, i.e., by tracking the steps that the user has taken after they encounter the issue and checking if the user workflow was successful or not. In one embodiment, the user log error data and user context data associated with the user critical issue is obtained and logged from a user computing system associated with the user of the software application via explicit user contribution, i.e., based on the user feedback.

In one embodiment, the obtained user log error data and user context data is stored. In one embodiment, the obtained user log error data and user context data is stored in a log error data and context data tracking database.

In one embodiment, the obtained user log error data and user context data is analyzed to determine if the obtained user log error data and user context data matches the error data and context data associated with any of the categorized well rated recurring error solution data representing well rated solutions to recurring errors.

In one embodiment, the user log error data and user context data associated with the user critical issue is obtained and logged from a user computing system associated with the user of the software application via implicit user contribution, i.e., by tracking the steps that the user has taken after they encounter the issue and checking if the user workflow was successful or not. In one embodiment, the user log error data and user context data associated with the user critical issue is obtained and logged from a user computing system associated with the user of the software application via explicit user contribution, i.e., based on the user feedback.

In one embodiment, if the obtained user log error data and user context data is determined to match the error data and context data associated with a given well rated solution to the recurring error represented by a relevant portion of the categorized well rated recurring error solution data, an action message is generated and transmitted to the user computing system through the message based action system associated with the software application. In one embodiment, the action message provides the user access to the relevant portion of the categorized well rated recurring error solution data representing the solution to the matched user log error data and user context data of the user critical issue report data.

In one embodiment, the well rated recurring error solution matching the user log error data and user context data of the user critical issue report data is then implemented on the user computing system using the transmitted relevant portion of the categorized well rated recurring error solution data through the software application.

In one embodiment, the success of the implementation of the well rated recurring error solution matching the user log error data and user context data of the user critical issue report data is monitored via implicit user contribution, i.e., by tracking the steps that the user has taken after they encounter the issue and checking if the user workflow was successful or not. In one embodiment, the success of the implementation of the well rated recurring error solution matching the user log error data and user context data of the user critical issue report data is monitored via explicit user contribution, i.e., based on the user feedback.

In one embodiment, if the obtained user log error data and user context data is determined not to match the error data and context data associated with any well rated solution to the recurring error of the categorized well rated recurring error solution data, an error solution and matching service is used to dynamically generate new recurring error solution data representing a solution to the error indicated in the obtained user log error data and user context data associated with the user critical issue report data.

In one embodiment, an action message is then transmitted to the user computing system through the message based action system associated with the software application providing the user access to the new recurring error solution data representing a solution to the error indicated in the obtained user log error data and user context data associated with the user critical issue report data.

In one embodiment, the new recurring error solution data representing a solution to the error indicated in the obtained user log error data and user context data associated with the user critical issue report data is then implemented on the user computing system.

In one embodiment, the success of the new recurring error solution data representing a solution to the error indicated in the obtained user log error data and user context data associated with the user critical issue report data is monitored via implicit user contribution, i.e., by tracking the steps that the user has taken after they encounter the issue and checking if the user workflow was successful or not. In one embodiment, the success of the new recurring error solution data representing a solution to the error indicated in the obtained user log error data and user context data associated with the user critical issue report data is monitored via explicit user contribution, i.e., based on the user feedback.

In one embodiment, the new recurring error solution data representing a solution to the error indicated in the obtained user log error data and user context data associated with the user critical issue report data is then classified according to the user log error data and user context data associated with the user critical issue report data to generate categorized new recurring error solution data.

In one embodiment, the categorized new recurring error solution data is then stored for further use when other users encounter the error indicated in the obtained user log error data and user context data associated with the user critical issue report data.

FIG. 1 shows a generalized operational workflow 100 of a method and system for dynamically unblocking customers in critical workflows by pushing community contributed solutions just-in-time when an error is encountered, in accordance with one embodiment.

Referring to FIG. 1, in one embodiment, at USER ENCOUNTERS AN ACCESS OR CRITICAL ISSUE 101, a user of the software application encounters an access blockage or other critical issue. In one embodiment, at MULTIPLE USERS ENCOUNTER THE SAME ACCESS OR CRITICAL ISSUE 105, multiple users of the software application encounter the same access blockage or other critical issue encountered by the user at USER ENCOUNTERS AN ACCESS OR CRITICAL ISSUE 101.

In one embodiment, at ERROR LOGGING PORTAL SERVICE RECEIVES CRITICAL ISSUE REPORT 103, a user critical issue report is received from a user of the software application, and/or a user computing system associated with the user of the software application, indicating the user has encountered the access issue or other critical issue.

In one embodiment, at ERROR AND CONTEXT DATA IS CAPTURED AND LOGGED 107, user log error data and user context data associated with the user critical issue of USER ENCOUNTERS AN ACCESS OR CRITICAL ISSUE 101 and MULTIPLE USERS ENCOUNTER THE SAME ACCESS OR CRITICAL ISSUE 105 is obtained and logged from a user computing system associated with the user of the software application. In one embodiment, the user log error data and user context data associated with the user critical issue is obtained using an error logging portal service that captures the user log error data and user context data.

In one embodiment, the obtained user log error data and user context data is stored. In one embodiment, the obtained user log error data and user context data is stored in a log error data and context data tracking database such as TRACKING DATABASE 109. In one embodiment, using TRACKING DATABASE 109 a determination is made that the combined number of users encountering the access blockage or critical issue of USER ENCOUNTERS AN ACCESS OR CRITICAL ISSUE 101 and MULTIPLE USERS ENCOUNTER THE SAME ACCESS OR CRITICAL ISSUE 105 is greater than the defined threshold error occurrence rate, i.e., the occurrence rate of the error associated with the critical issue is greater than a defined threshold error occurrence rate.

Since the occurrence rate of the error associated with the critical issue of USER ENCOUNTERS AN ACCESS OR CRITICAL ISSUE 101 and MULTIPLE USERS ENCOUNTER THE SAME ACCESS OR CRITICAL ISSUE 105 is determined to be greater than the defined threshold error occurrence rate, the community portal is updated to allow for solutions to the error to be obtained from one or more sources and posted to the community portal at SOLUTION SERVICE PROVIDES POTENTIAL SOLUTIONS/WORKAROUNDS 113. In one embodiment, the solutions to the error obtained from one or more sources and posted to the community portal at SOLUTION SERVICE PROVIDES POTENTIAL SOLUTIONS/WORKAROUNDS 113 are rated at RECURRING ERROR SOLUTION DATA IS CATEGORIZED AND RATED 111 and those solutions having ratings greater than a defined threshold rating are defined as well rated solutions. The solutions data representing these well rated solutions is then categorized at RECURRING ERROR SOLUTION DATA IS CATEGORIZED AND RATED 111.

In one embodiment, at IS ERROR AND CONTEXT DATA MATCHED TO A WELL RATED SOLUTION? 114, the obtained user log error data and user context data is analyzed to determine if the obtained user log error data and user context data of ERROR AND CONTEXT DATA IS CAPTURED AND LOGGED 107 matches the error data and context data associated with any of the categorized well rated recurring error solution data representing well rated solutions to recurring errors of RECURRING ERROR SOLUTION DATA IS CATEGORIZED AND RATED 111.

In one embodiment, if the obtained user log error data and user context data is determined to match the error data and context data associated with a given well rated solution to the recurring error represented by a relevant portion of the categorized well rated recurring error solution data at IS ERROR AND CONTEXT DATA MATCHED TO A WELL RATED SOLUTION? 114, an action message is generated and transmitted to the user computing system through the message based action system associated with the software application at PUSH WELL RATED SOLUTION TO USER 116.

In one embodiment, the action message of PUSH WELL RATED SOLUTION TO USER 116 provides the user access to the relevant portion of the categorized well rated recurring error solution data representing the solution to the matched user log error data and user context data of the user critical issue report data. In one embodiment, the well rated recurring error solution matching the user log error data and user context data of the user critical issue report data is then implemented on the user computing system using the transmitted relevant portion of the categorized well rated recurring error solution data through the software application.

In one embodiment, if the obtained user log error data and user context data is determined not to match the error data and context data associated with any well rated solution to the recurring error of the categorized well rated recurring error solution data at IS ERROR AND CONTEXT DATA MATCHED TO A WELL RATED SOLUTION? 114, an error solution and matching service is used to dynamically generate new recurring error solution data representing a solution to the error indicated in the obtained user log error data and user context data associated with the user critical issue report data at ERROR ANALYSIS AND MATCHING SERVICE ANALYZES NEW ERROR/CONTEXT, AND FINDS A SOLUTION 117.

In one embodiment, an action message is then transmitted to the user computing system through the message based action system associated with the software application at MATCHED NEW ERROR/CONTEXT AND SOLUTION PUSHED TO SERVER FOR USE BY CURRENT USER AND FUTURE USERS 119. In one embodiment, the action message of MATCHED NEW ERROR/CONTEXT AND SOLUTION PUSHED TO SERVER FOR USE BY CURRENT USER AND FUTURE USERS 119 provides the user access to the new recurring error solution data representing a solution to the error indicated in the obtained user log error data and user context data associated with the user critical issue report data of ERROR ANALYSIS AND MATCHING SERVICE ANALYZES NEW ERROR/CONTEXT, AND FINDS A SOLUTION 117.

In one embodiment, the new recurring error solution data representing a solution to the error indicated in the obtained user log error data and user context data associated with the user critical issue report data of ERROR ANALYSIS AND MATCHING SERVICE ANALYZES NEW ERROR/CONTEXT, AND FINDS A SOLUTION 117 is then implemented on the user computing system.

In one embodiment, the new recurring error solution data representing a solution to the error indicated in the obtained user log error data and user context data associated with the user critical issue report data of ERROR ANALYSIS AND MATCHING SERVICE ANALYZES NEW ERROR/CONTEXT, AND FINDS A SOLUTION 117 is then classified according to the user log error data and user context data associated with the user critical issue report data to generate categorized new recurring error solution data.

In one embodiment, the categorized well rated recurring error solution data of ERROR ANALYSIS AND MATCHING SERVICE ANALYZES NEW ERROR/CONTEXT, AND FINDS A SOLUTION 117 is then stored for further use when other users encounter the error indicated in the obtained user log error data and user context data associated with the user critical issue report data.

The disclosed method and system for dynamically unblocking customers in critical workflows by pushing community contributed solutions just-in-time when an error is encountered provides for unblocking customers/users of a software application without the need for applying a data fix or releasing a patch or a new application version until a long-term solution can be formulated and implemented. Therefore, the disclosed method and system for dynamically unblocking customers in critical workflows by pushing community contributed solutions just-in-time when an error is encountered solves the long standing technical problem in the workflow application environment of users of a software application getting stuck and blocked from making progress with their workflows due to system, setup, data synchronization issues, and/or other critical issues, without applying a data fix or releasing a patch or new application version.

The disclosed method and system for dynamically unblocking customers in critical workflows by pushing community contributed solutions just-in-time when an error is encountered does not encompass, embody, or preclude other forms of innovation in the area of workflow applications. In addition, the disclosed method and system for dynamically unblocking customers in critical workflows by pushing community contributed solutions just-in-time when an error is encountered is not related to fundamental economic practice, data processing practice, mental steps, or pen and paper based solutions, and is in fact directed to providing solutions to the relatively new problems associated with distributed workflow applications. Consequently, the disclosed method and system for dynamically unblocking customers in critical workflows by pushing community contributed solutions just-in-time when an error is encountered is not directed to, does not encompass, and is not merely, an abstract idea or concept.

In addition, the disclosed method and system for dynamically unblocking customers in critical workflows by pushing community contributed solutions just-in-time when an error is encountered provides for significant improvements to the technical fields of customer support, information dissemination, software implementation, user experience, data processing, data management, distributed workflow applications, client server applications, and real time application fixes.

In addition the disclosed method and system for dynamically unblocking customers in critical workflows by pushing community contributed solutions just-in-time when an error is encountered provides for the processing of only relevant portions of data and data analysis before the data is further analyzed, processed, and/or transmitted or distributed. Consequently, using the disclosed method and system for dynamically unblocking customers in critical workflows by pushing community contributed solutions just-in-time when an error is encountered results in more efficient use of human and non-human resources, fewer processor cycles being utilized, reduced memory utilization, and less communications bandwidth being utilized to relay data to and from backend systems and client systems. As a result, computing systems are transformed into faster, more efficient, and more effective computing systems by implementing the method and system for dynamically unblocking customers in critical workflows by pushing community contributed solutions just-in-time when an error is encountered.

Process

In accordance with one embodiment, error occurrence/recurrence rates associated with critical issue reports from multiple users of a software system are monitored. In one embodiment, log error data and context data associated with the critical issue is provided to a server side repository. In one embodiment, when it is detected that a threshold number of users of a software application are facing a given critical issue, such as blocking of data access in a defined context, i.e., a threshold recurrence of the same log error data and context data is detected, a community portal is updated with a facility for users to post their solutions, i.e., workarounds, and/or observations, and/or comments, associated with the specific critical issue/error. In one embodiment, the posted solutions are rated and/or monitored, and if the rating(s) for a given solution are above a threshold rating value, then data representing the solution, and/or implementing the solution, is pushed to users who continue to encounter the same critical issue, in one embodiment, using an action message framework, until a permanent fix is applied.

Figure 2:
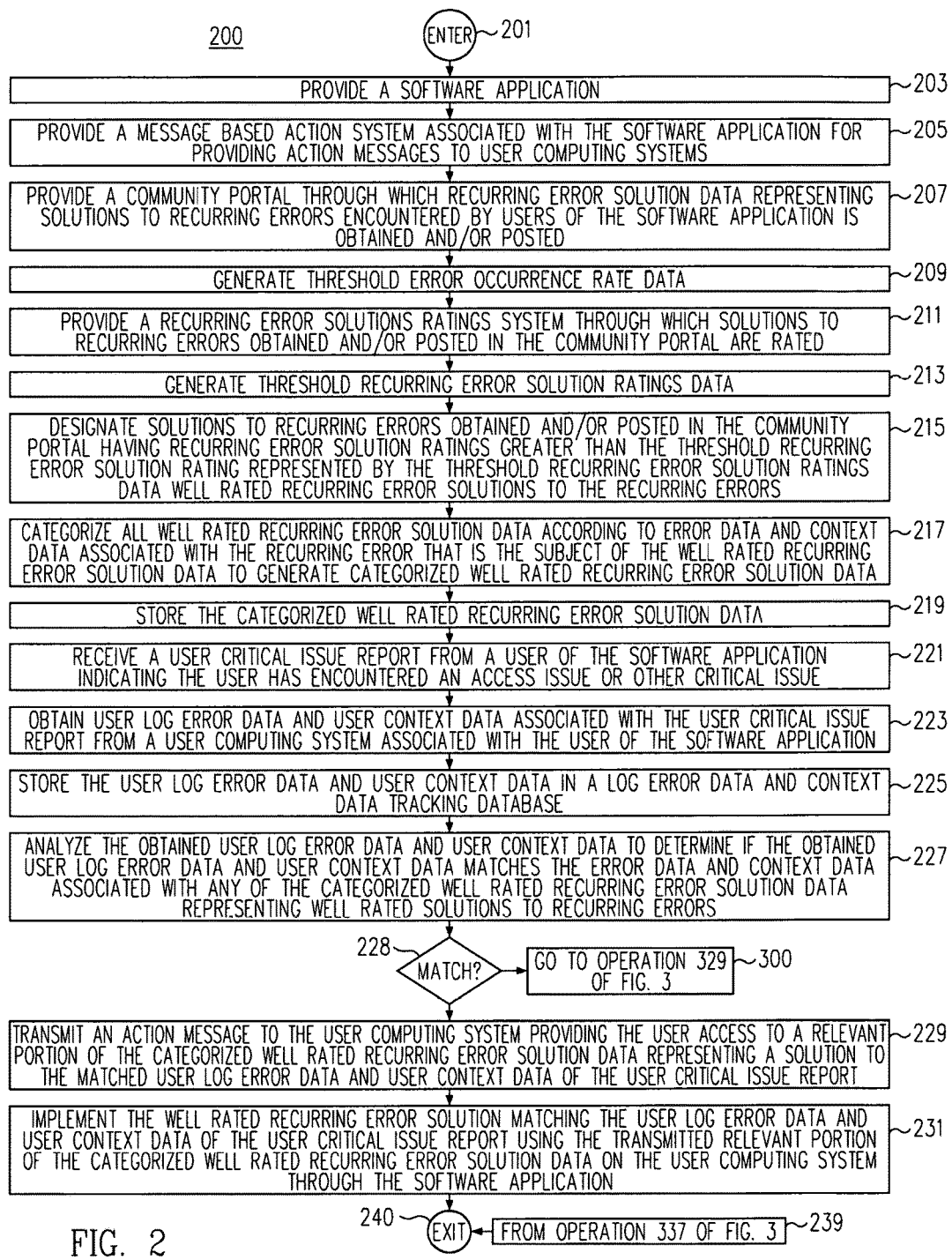
FIG. 2 and FIG. 3 together are a flow chart representing one example of a generalized process for dynamically unblocking customers in critical workflows by pushing community contributed solutions just-in-time when an error is encountered, in accordance with one embodiment.
Figure 3:
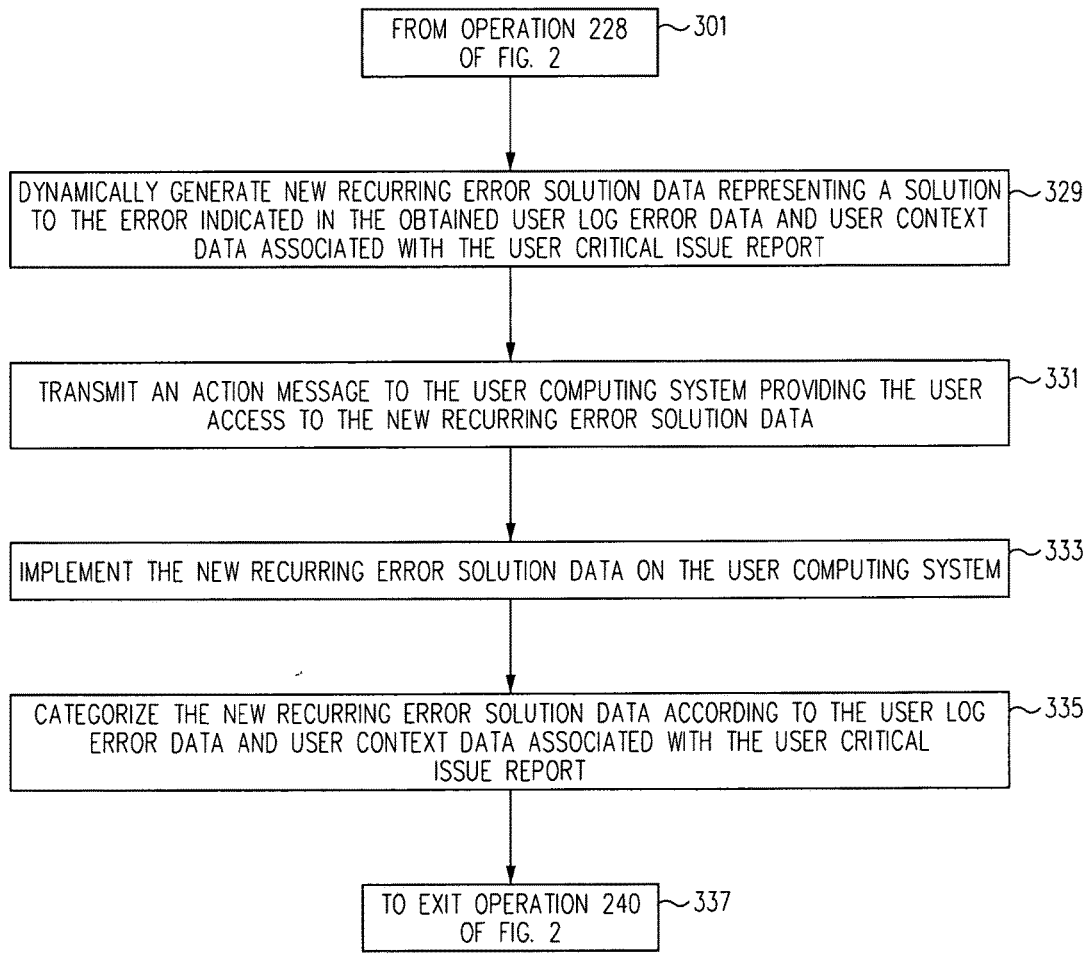

FIGS. 2 and 3 are a flow chart representing one example of a process 200 for dynamically unblocking customers in critical workflows by pushing community contributed solutions just-in-time when an error is encountered in accordance with one embodiment.

As seen in FIG. 2, process 200 for dynamically unblocking customers in critical workflows by pushing community contributed solutions just-in-time when an error is encountered begins at ENTER OPERATION 201 and process flow proceeds to PROVIDE A SOFTWARE APPLICATION OPERATION 203.

In one embodiment, at PROVIDE A SOFTWARE APPLICATION OPERATION 203, a software application is provided for use by one or more users. In various embodiments, the software application of PROVIDE A SOFTWARE APPLICATION OPERATION 203 is any software application as discussed herein, and/or as known at the time of filing, and/or as developed after the time of filing.

In one embodiment, once a software application is provided at PROVIDE A SOFTWARE APPLICATION OPERATION 203, process flow proceeds to PROVIDE A MESSAGE BASED ACTION SYSTEM ASSOCIATED WITH THE SOFTWARE APPLICATION FOR PROVIDING ACTION MESSAGES TO USER COMPUTING SYSTEMS OPERATION 205.

In one embodiment, at PROVIDE A MESSAGE BASED ACTION SYSTEM ASSOCIATED WITH THE SOFTWARE APPLICATION FOR PROVIDING ACTION MESSAGES TO USER COMPUTING SYSTEMS OPERATION 205, a message based action system associated with the software application is provided using one or more computing systems.

As noted above, in one embodiment, the provided message based action system is a loosely coupled message based action framework for dynamically unblocking customers in critical workflows by pushing community contributed solutions just-in-time when an error is encountered that allows the developers and product managers to dynamically control the software application behavior based on the action messages and message actions defined on the server and these message actions can be targeted to a specific user or a set of users based on the criteria defined on the server.

As noted above, as used herein, the term "action message" includes messages used to send customized notification payloads that cause specific operations or actions to occur when a notification is received or activated and that logically, and operationally, connect what the provided software application running on user computing systems does, and what operations it performs on user computing systems, with what the software application provider/software application server sends through the action message.

As also noted above, as used herein, the term "action message system" includes an action message framework that represents and creates a cooperation between the provided software application user's computing system and the action messages sent to the provided software application user's computing system through the software application itself. Consequently, as used herein, the terms "action message system" and "action message framework" do not necessarily mean a mobile or server-side technology on its own, but rather a cooperation between the provided software application user's computing system and the action messages sent to it. Consequently, using an "action message system" the provided software application user's computing system needs to know how to perform tasks indicated in an action message by name, with optional arguments, in certain distinct situations, with an optional result value.

To this end, in one embodiment, each message action of an action message includes at least the following attributes: condition for the action; context; and action. In one embodiment, the condition for the action attribute supports logical expression with the ability to use any exposed variables in the software application such as, but not limited to, companyId, userId, version code, etc., global and context based. In addition, in one embodiment, a variable called "now" that represents the time in milliseconds from Jan. 1, 1970 midnight GMT is also available.

In one embodiment, the context attribute defines the context or placement when/where the message actions will be executed in the software application, such as, but not limited to, when the software application starts, when an error occurs, or during upgrade flow, etc.

In one illustrative embodiment, the available contexts include, but are not limited to, an appstart context, e.g., called very early on in the software application initialization.

In one illustrative embodiment, the available contexts include, but are not limited to, a syncparseerror context, e.g., called when an entity parsing error happens during synchronization. In one embodiment, the syncparseerror context variables available to use include, but are not limited to: syncerrorcode, an error code representing the specific entity parse error; and syncerrorentity, an entity name that has the parse error.

In one illustrative embodiment, the available contexts include, but are not limited to, a syncerror context, e.g., called when a batch request contains a fault item. In one embodiment, this is executed for each fault response item. In one embodiment, syncerror context variables available to use include, but are not limited to: syncerrorcode, the error code from server; and syncerrormessage, the error message from server.

In one illustrative embodiment, the available contexts include, but are not limited to, an activitystart context, e.g., called once for each activity start. As an illustrative example, activity in an Android™ environment corresponds to a new screen/page. In one embodiment, the activitystart context variables available to use include, but are not limited to, activityname, the name of the activity.

In one illustrative embodiment, the available contexts include, but are not limited to, a synccomplete context, e.g., called once the foreground synchronization is completed.

In one illustrative embodiment, the available contexts include, but are not limited to, a homepage context, e.g., called whenever the homepage is shown.

In one illustrative embodiment, the available contexts include, but are not limited to, a new version context, e.g., called the first time a new version is launched.

In one illustrative embodiment, the available contexts include, but are not limited to, an afterupgrade context, e.g., called the first time after an upgraded software application is launched.

In one illustrative embodiment, the available contexts include, but are not limited to, a logerror context, e.g., called when errors are logged. In one embodiment, logerror context variables available to use include, but are not limited to, logmessage, a message that is logged.

In one illustrative embodiment, the available contexts include, but are not limited to, a loginfo context, e.g., called when information is logged. In one embodiment, loginfo context variables available to use include, but are not limited to, logmessage, a message that is logged.

Although specific illustrative examples of contexts are discussed above, those of skill in the art will recognize that different, more, or less, contexts can be defined and implemented using different, similar, or the same nomenclature/ symbols and functionality. Consequently, the specific context examples discussed herein are presented as illustrative examples only and do not limit the scope of the claims presented below.

In one embodiment, the actions are predefined actions available in the software application. In one embodiment, actions are identified by name and are registered with the action message system/framework.

In one embodiment, action messages are delivered to the software application user's computing system, i.e., the client, through software application settings. In one embodiment, the key is actionmessages.expr. In one embodiment, each available action includes; 1. A name data field indicating the defined name of the action; 2. A one-time message (otm) data field indicating if the action is executed only once; and 3. An action JSON field indicating any action specific JSON as a string.

As an illustrative example of one embodiment, the actions supported include, but are not limited to, an alert action, e.g., an action that shows an alert dialog with ok and cancel buttons. In one embodiment, the following attributes of the alert can be customized:
 a. title—the title for the dialog;
 b. message—the message for the dialog;
 c. okCaption—an ok button caption;
 d. cancelCaption—a cancel button caption;
 e. okAction—the definition of the action that needs to be executed when the user clicks the ok button; and
 f. cancelAction—the definition of the action that needs to be executed when the user clicks the cancel button.

As an illustrative example of one embodiment, the actions supported include, but are not limited to, a fullsync action that triggers a full data synchronization.

As an illustrative example of one embodiment, the actions supported include, but are not limited to, a skipsyncerror action that skips a synchronization (sync) error. In one embodiment, the skipsyncerror action is used for parsing errors.

As an illustrative example of one embodiment, the actions supported include, but are not limited to, an alogsyncerror action that logs sync error details including logging JSON response data.

As an illustrative example of one embodiment, the actions supported include, but are not limited to, a goforupgrade action that takes the user to the software application upgrade flow.

As an illustrative example of one embodiment, the actions supported include, but are not limited to, a dynamic action that dynamically adds an action message to execute at a later time or event.

Although specific illustrative examples of actions are discussed above, those of skill in the art will recognize that different, more, or less, actions can be defined and implemented using different, similar, or the same nomenclature/ symbols and functionality. Consequently, the specific action examples discussed herein are presented as illustrative examples only and do not limit the scope of the claims presented below.

Continuing with the specific illustrative example above, one illustrative action message format could be [{context: "AAA",condition:"BBB",actions:[{name:"CCC", otm: True or False, actionJson:NULL or DDD}]}] where: AAA represents the context data; BBB represents the condition data; CCC represents the action; True or False represents True or False; Null represents the null set, or none; and DDD represents the JSON.

As an even more specific illustrative example of one embodiment, a sample message action could be:
 [{context:"syncerror", condition:"syncerrorcode=2019", actions:[{name:"skipsyncerror", otm: true, actionJson: null}]}].

This sample message action indicates that its context is "syncerror" meaning it can happen when application synchronization has failed. This sample message action indicates that its condition is"syncerrorcode=2019" meaning the entity having code 2019 has failed to synchronize. Note: the condition is always a logical expression. This sample message action indicates the action "skipsyncerror" meaning there is some code associated with the action "skipsyncerror" which lets the user skip this error and get unblocked. This sample message action indicates the otm field is true, i.e., the action is performed only once. This sample message action indicates the action JSON field is null, meaning there is no action JSON.

Although specific illustrative examples of action messages are discussed above, those of skill in the art will recognize that different action message/message action formats can be defined and implemented using different, similar, or the same nomenclature/symbols and functionality. Consequently, the specific action message/message action format examples discussed herein are presented as illustrative examples only and do not limit the scope of the claims presented below.

In one embodiment, once a message based action system associated with the software application is provided using one or more computing systems at PROVIDE A MESSAGE BASED ACTION SYSTEM ASSOCIATED WITH THE SOFTWARE APPLICATION FOR PROVIDING ACTION MESSAGES TO USER COMPUTING SYSTEMS OPERATION 205, process flow proceeds to PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207.

In one embodiment, at PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207, a community portal for the software application is provided using one or more computing systems.

In one embodiment, through the community portal of PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207, recurring error solution data representing solutions to recurring errors encountered by users of the software application is obtained and/or posted.

In one embodiment, the solutions to recurring errors encountered by users of the software application are obtained from a solution service and/or developers and technicians associated with the software application provider at PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207.

In one embodiment, the solutions to recurring errors encountered by users of the software application are obtained from the software application users themselves at PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207.

In one embodiment, the solutions to recurring errors encountered by users of the software application are obtained from the software application users themselves through implicit user contribution, i.e., by tracking the steps that the user has taken after they encounter the issue and checking if the user workflow was successful or not. In one embodiment, the solutions to recurring errors encountered by users of the software application are obtained from the software application users themselves through explicit user contribution, i.e., based on user feedback.

In one embodiment, once a community portal for the software application is provided using one or more computing systems at PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207, process flow proceeds to GENERATE THRESHOLD ERROR OCCURRENCE RATE DATA OPERATION 209.

In one embodiment, at GENERATE THRESHOLD ERROR OCCURRENCE RATE DATA OPERATION 209, a threshold error occurrence rate is defined and threshold error occurrence rate data is generated representing the defined threshold error occurrence rate.

In one embodiment, the threshold error occurrence rate is defined such that if an error occurs more than the threshold error occurrence rate, the error is designated a recurring error and the community portal for the software application of PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207 is updated to allow recurring error solution data representing solutions to the recurring error to be obtained and/or posted.

In one embodiment, once a threshold error occurrence rate is defined and threshold error occurrence rate data is generated representing the defined threshold error occurrence rate at GENERATE THRESHOLD ERROR OCCURRENCE RATE DATA OPERATION 209, process flow proceeds to PROVIDE A RECURRING ERROR SOLUTIONS RATINGS SYSTEM THROUGH WHICH SOLUTIONS TO RECURRING ERRORS OBTAINED AND/OR POSTED IN THE COMMUNITY PORTAL ARE RATED OPERATION 211.

In one embodiment, at PROVIDE A RECURRING ERROR SOLUTIONS RATINGS SYSTEM THROUGH WHICH SOLUTIONS TO RECURRING ERRORS OBTAINED AND/OR POSTED IN THE COMMUNITY PORTAL ARE RATED OPERATION 211, a recurring error solutions ratings system is provided using one or more computing systems.

In one embodiment, through the recurring error solutions ratings system of PROVIDE A RECURRING ERROR SOLUTIONS RATINGS SYSTEM THROUGH WHICH SOLUTIONS TO RECURRING ERRORS OBTAINED AND/OR POSTED IN THE COMMUNITY PORTAL ARE RATED OPERATION 211, the recurring error solution data representing solutions to recurring errors obtained and/or posted in the community portal for the software application of PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207 are rated and associated recurring error solution ratings data is generated.

In one embodiment, at PROVIDE A RECURRING ERROR SOLUTIONS RATINGS SYSTEM THROUGH WHICH SOLUTIONS TO RECURRING ERRORS OBTAINED AND/OR POSTED IN THE COMMUNITY PORTAL ARE RATED OPERATION 211, the recurring error solution data representing solutions to recurring errors obtained and/or posted in the community portal for the software application of PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207 are rated and associated recurring error solution ratings data is generated based on reviews submitted by the software system users.

In one embodiment, at PROVIDE A RECURRING ERROR SOLUTIONS RATINGS SYSTEM THROUGH WHICH SOLUTIONS TO RECURRING ERRORS OBTAINED AND/OR POSTED IN THE COMMUNITY PORTAL ARE RATED OPERATION 211, the recurring error solution data representing solutions to recurring errors obtained and/or posted in the community portal for the software application of PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207 are rated and associated recurring error solution ratings data is generated based on the monitored and logged success rates of solutions to recurring errors implemented on user computing systems.

In one embodiment, the success rates of solutions to recurring errors implemented on user computing systems is monitored and logged through implicit user contribution, i.e., by tracking the steps that the user has taken after they encounter the issue and checking if the user workflow was successful or not. In one embodiment, the success rates of solutions to recurring errors implemented on user computing systems is monitored and logged through explicit user contribution, i.e., based on user feedback.

In one embodiment, once the recurring error solution data representing solutions to recurring errors obtained and/or posted in the community portal for the software application of PROVIDE A COMMUNITY PORTAL THROUGH WHICH RECURRING ERROR SOLUTION DATA REPRESENTING SOLUTIONS TO RECURRING ERRORS ENCOUNTERED BY USERS OF THE SOFTWARE APPLICATION IS OBTAINED AND/OR POSTED OPERATION 207 are rated and associated recurring error solution ratings data is generated at PROVIDE A RECURRING ERROR SOLUTIONS RATINGS SYSTEM THROUGH WHICH SOLUTIONS TO RECURRING ERRORS OBTAINED AND/OR POSTED IN THE COMMUNITY PORTAL ARE RATED OPERATION 211, process flow proceeds to GENERATE THRESHOLD RECURRING ERROR SOLUTION RATINGS DATA OPERATION 213.

In one embodiment, at GENERATE THRESHOLD RECURRING ERROR SOLUTION RATINGS DATA OPERATION 213 a threshold recurring error solution rating is defined and threshold recurring error solution rating data representing the defined threshold recurring error solution rating is generated.

In one embodiment, the threshold recurring error solution rating is defined at GENERATE THRESHOLD RECURRING ERROR SOLUTION RATINGS DATA OPERATION 213 such that if recurring error solution data representing a solution to a recurring error obtained and/or posted in the community portal for the software application has associated recurring error solution ratings data representing a recurring error solution rating for the recurring error solution data greater than the threshold recurring error solution rating represented by the threshold recurring error solution ratings data, the recurring error solution data is designated well rated recurring error solution data representing a well rated solution to the recurring error.

In one embodiment, once a threshold recurring error solution rating is defined and threshold recurring error solution rating data representing the defined threshold recurring error solution rating is generated at GENERATE THRESHOLD RECURRING ERROR SOLUTION RATINGS DATA OPERATION 213, process flow proceeds to DESIGNATE SOLUTIONS TO RECURRING ERRORS OBTAINED AND/OR POSTED IN THE COMMUNITY PORTAL HAVING RECURRING ERROR SOLUTION RATINGS GREATER THAN THE THRESHOLD RECURRING ERROR SOLUTION RATING REPRESENTED BY THE THRESHOLD RECURRING ERROR SOLUTION RATINGS DATA WELL RATED RECURRING ERROR SOLUTIONS TO THE RECURRING ERRORS OPERATION 215.

In one embodiment, at DESIGNATE SOLUTIONS TO RECURRING ERRORS OBTAINED AND/OR POSTED IN THE COMMUNITY PORTAL HAVING RECURRING ERROR SOLUTION RATINGS GREATER THAN THE THRESHOLD RECURRING ERROR SOLUTION RATING REPRESENTED BY THE THRESHOLD RECURRING ERROR SOLUTION RATINGS DATA WELL RATED RECURRING ERROR SOLUTIONS TO THE RECURRING ERRORS OPERATION 215, all recurring error solution data representing a solution to a recurring error obtained and/or posted in the community portal for the software application that has associated recurring error solution ratings data representing a recurring error solution rating for the recurring error solution data greater than the threshold recurring error solution rating represented by the threshold recurring error solution ratings data, is designated well rated recurring error solution data representing a well rated solution to the recurring error.

In one embodiment, once all recurring error solution data representing a solution to a recurring error obtained and/or posted in the community portal for the software application that has associated recurring error solution ratings data representing a recurring error solution rating for the recurring error solution data greater than the threshold recurring error solution rating represented by the threshold recurring error solution ratings data, is designated well rated recurring error solution data representing a well rated solution to the recurring error at DESIGNATE SOLUTIONS TO RECURRING ERRORS OBTAINED AND/OR POSTED IN THE COMMUNITY PORTAL HAVING RECURRING ERROR SOLUTION RATINGS GREATER THAN THE THRESHOLD RECURRING ERROR SOLUTION RATING REPRESENTED BY THE THRESHOLD RECURRING ERROR SOLUTION RATINGS DATA WELL RATED RECURRING ERROR SOLUTIONS TO THE RECURRING ERRORS OPERATION 215, process flow proceeds to CATEGORIZE ALL WELL RATED RECURRING ERROR SOLUTION DATA ACCORDING TO ERROR DATA AND CONTEXT DATA ASSOCIATED WITH THE RECURRING ERROR THAT IS THE SUBJECT OF THE WELL RATED RECURRING ERROR SOLUTION DATA TO GENERATE CATEGORIZED WELL RATED RECURRING ERROR SOLUTION DATA OPERATION 217.

In one embodiment, at CATEGORIZE ALL WELL RATED RECURRING ERROR SOLUTION DATA ACCORDING TO ERROR DATA AND CONTEXT DATA ASSOCIATED WITH THE RECURRING ERROR THAT IS THE SUBJECT OF THE WELL RATED RECURRING ERROR SOLUTION DATA TO GENERATE CATEGORIZED WELL RATED RECURRING ERROR SOLUTION DATA OPERATION 217, all well rated recurring error solution data of DESIGNATE SOLUTIONS TO RECURRING ERRORS OBTAINED AND/OR POSTED IN THE COMMUNITY PORTAL HAVING RECURRING ERROR SOLUTION RATINGS GREATER THAN THE THRESHOLD RECURRING ERROR SOLUTION RATING REPRESENTED BY THE THRESHOLD RECURRING ERROR SOLUTION RATINGS DATA WELL RATED RECURRING ERROR SOLUTIONS TO THE RECURRING ERRORS OPERATION 215 is categorized according to error data and context data associated with the recurring error that is the subject of the well rated recurring error solution data to generate categorized well rated recurring error solution data.

In one embodiment, once all well rated recurring error solution data of DESIGNATE SOLUTIONS TO RECURRING ERRORS OBTAINED AND/OR POSTED IN THE COMMUNITY PORTAL HAVING RECURRING ERROR SOLUTION RATINGS GREATER THAN THE THRESHOLD RECURRING ERROR SOLUTION RATING REPRESENTED BY THE THRESHOLD RECURRING ERROR SOLUTION RATINGS DATA WELL RATED RECURRING ERROR SOLUTIONS TO THE RECURRING ERRORS OPERATION 215 is categorized according to error data and context data associated with the recurring error that is the subject of the well rated recurring error solution data to generate categorized well rated recurring error solution data, process flow proceeds to STORE THE CATEGORIZED WELL RATED RECURRING ERROR SOLUTION DATA OPERATION 219.

In one embodiment, at STORE THE CATEGORIZED WELL RATED RECURRING ERROR SOLUTION DATA OPERATION 219, the categorized well rated recurring error solution data is stored.

In one embodiment, once the categorized well rated recurring error solution data is stored at STORE THE CATEGORIZED WELL RATED RECURRING ERROR SOLUTION DATA OPERATION 219, process flow proceeds to RECEIVE A USER CRITICAL ISSUE REPORT FROM A USER OF THE SOFTWARE APPLICATION INDICATING THE USER HAS ENCOUNTERED AN ACCESS ISSUE OR OTHER CRITICAL ISSUE OPERATION 221.

In one embodiment, at RECEIVE A USER CRITICAL ISSUE REPORT FROM A USER OF THE SOFTWARE APPLICATION INDICATING THE USER HAS ENCOUNTERED AN ACCESS ISSUE OR OTHER CRITICAL ISSUE OPERATION 221, a user of the software application encounters an access blockage or other critical issue.

In one embodiment, at RECEIVE A USER CRITICAL ISSUE REPORT FROM A USER OF THE SOFTWARE APPLICATION INDICATING THE USER HAS ENCOUNTERED AN ACCESS ISSUE OR OTHER CRITICAL ISSUE OPERATION 221 user critical issue report data is received from a user of the software application, and/or a user computing system associated with the user of the software application, indicating the user has encountered the access issue or other critical issue.

In one embodiment, once a user of the software application encounters an access blockage or other critical issue at RECEIVE A USER CRITICAL ISSUE REPORT FROM A USER OF THE SOFTWARE APPLICATION INDICATING THE USER HAS ENCOUNTERED AN ACCESS ISSUE OR OTHER CRITICAL ISSUE OPERATION 221, process flow proceeds to OBTAIN USER LOG ERROR DATA AND USER CONTEXT DATA ASSOCIATED WITH THE USER CRITICAL ISSUE REPORT FROM A USER COMPUTING SYSTEM ASSOCIATED WITH THE USER OF THE SOFTWARE APPLICATION OPERATION 223.

In one embodiment, at OBTAIN USER LOG ERROR DATA AND USER CONTEXT DATA ASSOCIATED WITH THE USER CRITICAL ISSUE REPORT FROM A USER COMPUTING SYSTEM ASSOCIATED WITH THE USER OF THE SOFTWARE APPLICATION OPERATION 223, user log error data and user context data associated with the user critical issue is obtained and logged from a user computing system associated with the user of the software application.

In one embodiment, at OBTAIN USER LOG ERROR DATA AND USER CONTEXT DATA ASSOCIATED WITH THE USER CRITICAL ISSUE REPORT FROM A USER COMPUTING SYSTEM ASSOCIATED WITH THE USER OF THE SOFTWARE APPLICATION OPERATION 223 the user log error data and user context data associated with the user critical issue is obtained using an error logging portal service that captures the user log error data and user context data.

In one embodiment, the user log error data and user context data associated with the user critical issue is obtained and logged from a user computing system associated with the user of the software application at OBTAIN USER LOG ERROR DATA AND USER CONTEXT DATA ASSOCIATED WITH THE USER CRITICAL ISSUE REPORT FROM A USER COMPUTING SYSTEM ASSOCIATED WITH THE USER OF THE SOFTWARE APPLICATION OPERATION 223 via implicit user contribution, i.e., by tracking the steps that the user has taken after they encounter the issue and checking if the user workflow was successful or not.

In one embodiment, the user log error data and user context data associated with the user critical issue is obtained and logged from a user computing system associated with the user of the software application at OBTAIN USER LOG ERROR DATA AND USER CONTEXT DATA ASSOCIATED WITH THE USER CRITICAL ISSUE REPORT FROM A USER COMPUTING SYSTEM ASSOCIATED WITH THE USER OF THE SOFTWARE APPLICATION OPERATION 223 via explicit user contribution, i.e., based on the user feedback.

In one embodiment, once user log error data and user context data associated with the user critical issue is obtained and logged from a user computing system associated with the user of the software application at OBTAIN USER LOG ERROR DATA AND USER CONTEXT DATA ASSOCIATED WITH THE USER CRITICAL ISSUE REPORT FROM A USER COMPUTING SYSTEM ASSOCIATED WITH THE USER OF THE SOFTWARE APPLICATION OPERATION 223, process flow proceeds to STORE THE USER LOG ERROR DATA AND USER CONTEXT DATA IN A LOG ERROR DATA AND CONTEXT DATA TRACKING DATABASE OPERATION 225.

In one embodiment, at STORE THE USER LOG ERROR DATA AND USER CONTEXT DATA IN A LOG ERROR DATA AND CONTEXT DATA TRACKING DATABASE OPERATION 225, the obtained user log error data and user context data of OBTAIN USER LOG ERROR DATA AND USER CONTEXT DATA ASSOCIATED WITH THE USER CRITICAL ISSUE REPORT FROM A USER COMPUTING SYSTEM ASSOCIATED WITH THE USER OF THE SOFTWARE APPLICATION OPERATION 223 is stored.

In one embodiment, at STORE THE USER LOG ERROR DATA AND USER CONTEXT DATA IN A LOG ERROR DATA AND CONTEXT DATA TRACKING DATABASE OPERATION 225, the obtained user log error data and user context data of OBTAIN USER LOG ERROR DATA AND USER CONTEXT DATA ASSOCIATED WITH THE USER CRITICAL ISSUE REPORT FROM A USER COMPUTING SYSTEM ASSOCIATED WITH THE USER OF THE SOFTWARE APPLICATION OPERATION 223 is stored in a log error data and context data tracking database.

In one embodiment, once the obtained user log error data and user context data of OBTAIN USER LOG ERROR DATA AND USER CONTEXT DATA ASSOCIATED WITH THE USER CRITICAL ISSUE REPORT FROM A USER COMPUTING SYSTEM ASSOCIATED WITH THE USER OF THE SOFTWARE APPLICATION OPERATION 223 is stored at STORE THE USER LOG ERROR DATA AND USER CONTEXT DATA IN A LOG ERROR DATA AND CONTEXT DATA TRACKING DATABASE OPERATION 225, process flow proceeds to ANALYZE THE OBTAINED USER LOG ERROR DATA AND USER CONTEXT DATA TO DETERMINE IF THE OBTAINED USER LOG ERROR DATA AND USER CONTEXT DATA MATCHES THE ERROR DATA AND CONTEXT DATA ASSOCIATED WITH ANY OF THE CATEGORIZED WELL RATED RECURRING ERROR SOLUTION DATA REPRESENTING WELL RATED SOLUTIONS TO RECURRING ERRORS OPERATION 227.

In one embodiment, at ANALYZE THE OBTAINED USER LOG ERROR DATA AND USER CONTEXT DATA TO DETERMINE IF THE OBTAINED USER LOG ERROR DATA AND USER CONTEXT DATA MATCHES THE ERROR DATA AND CONTEXT DATA ASSOCIATED WITH ANY OF THE CATEGORIZED WELL RATED RECURRING ERROR SOLUTION DATA REPRESENTING WELL RATED SOLUTIONS TO RECURRING ERRORS OPERATION 227, the obtained user log error data and user context data is analyzed to determine if the obtained user log error data and user context data matches the error data and context data associated with any of the categorized well rated recurring error solution data representing well rated solutions to recurring errors.

In one embodiment, at ANALYZE THE OBTAINED USER LOG ERROR DATA AND USER CONTEXT DATA TO DETERMINE IF THE OBTAINED USER LOG ERROR DATA AND USER CONTEXT DATA MATCHES THE ERROR DATA AND CONTEXT DATA ASSOCIATED WITH ANY OF THE CATEGORIZED WELL RATED RECURRING ERROR SOLUTION DATA REPRESENTING WELL RATED SOLUTIONS TO RECURRING ERRORS OPERATION 227 the user log error data and user context data associated with the user critical issue is obtained and logged from a user computing system associated with the user of the software application via implicit user contribution, i.e., by tracking the steps that the user has taken after they encounter the issue and checking if the user workflow was successful or not.

In one embodiment, at ANALYZE THE OBTAINED USER LOG ERROR DATA AND USER CONTEXT DATA TO DETERMINE IF THE OBTAINED USER LOG ERROR DATA AND USER CONTEXT DATA MATCHES THE ERROR DATA AND CONTEXT DATA ASSOCIATED WITH ANY OF THE CATEGORIZED WELL RATED RECURRING ERROR SOLUTION DATA REPRESENTING WELL RATED SOLUTIONS TO RECURRING ERRORS OPERATION 227 the user log error data and user context data associated with the user critical issue is obtained and logged from a user computing system associated with the user of the software application via explicit user contribution, i.e., based on the user feedback.

In one embodiment, once the obtained user log error data and user context data is analyzed to determine if the obtained user log error data and user context data matches the error data and context data associated with any of the categorized well rated recurring error solution data representing well rated solutions to recurring errors at ANALYZE THE OBTAINED USER LOG ERROR DATA AND USER CONTEXT DATA TO DETERMINE IF THE OBTAINED USER LOG ERROR DATA AND USER CONTEXT DATA MATCHES THE ERROR DATA AND CONTEXT DATA ASSOCIATED WITH ANY OF THE CATEGORIZED WELL RATED RECURRING ERROR SOLUTION DATA REPRESENTING WELL RATED SOLUTIONS TO RECURRING ERRORS OPERATION 227, process flow proceeds to MATCH? OPERATION 228.

In one embodiment, if at MATCH? OPERATION 228 the obtained user log error data and user context data is determined to match the error data and context data associated with a given well rated solution to the recurring error represented by a relevant portion of the categorized well rated recurring error solution data, process flow proceeds to TRANSMIT AN ACTION MESSAGE TO THE USER COMPUTING SYSTEM PROVIDING THE USER ACCESS TO A RELEVANT PORTION OF THE CATEGORIZED WELL RATED RECURRING ERROR SOLUTION DATA REPRESENTING A SOLUTION TO THE MATCHED USER LOG ERROR DATA AND USER CONTEXT DATA OF THE USER CRITICAL ISSUE REPORT OPERATION 229.

In one embodiment, at TRANSMIT AN ACTION MESSAGE TO THE USER COMPUTING SYSTEM PROVIDING THE USER ACCESS TO A RELEVANT PORTION OF THE CATEGORIZED WELL RATED RECURRING ERROR SOLUTION DATA REPRESENTING A SOLUTION TO THE MATCHED USER LOG ERROR DATA AND USER CONTEXT DATA OF THE USER CRITICAL ISSUE REPORT OPERATION 229, once the obtained user log error data and user context data is determined to match the error data and context data associated with a given well rated solution to the recurring error represented by a relevant portion of the categorized well rated recurring error solution data, an action message is generated and transmitted to the user computing system through the message based action system associated with the software application.

In one embodiment, the action message provides the user access to the relevant portion of the categorized well rated recurring error solution data representing the solution to the matched user log error data and user context data of the user critical issue report data.

In one embodiment, once an action message is generated and transmitted to the user computing system through the message based action system associated with the software application at TRANSMIT AN ACTION MESSAGE TO THE USER COMPUTING SYSTEM PROVIDING THE USER ACCESS TO A RELEVANT PORTION OF THE CATEGORIZED WELL RATED RECURRING ERROR SOLUTION DATA REPRESENTING A SOLUTION TO THE MATCHED USER LOG ERROR DATA AND USER CONTEXT DATA OF THE USER CRITICAL ISSUE REPORT OPERATION 229, process flow proceeds to IMPLEMENT THE WELL RATED RECURRING ERROR SOLUTION MATCHING THE USER LOG ERROR DATA AND USER CONTEXT DATA OF THE USER CRITICAL ISSUE REPORT USING THE TRANSMITTED RELEVANT PORTION OF THE CATEGORIZED WELL RATED RECURRING ERROR SOLUTION DATA ON THE USER COMPUTING SYSTEM THROUGH THE SOFTWARE APPLICATION OPERATION 231.

In one embodiment, at IMPLEMENT THE WELL RATED RECURRING ERROR SOLUTION MATCHING THE USER LOG ERROR DATA AND USER CONTEXT DATA OF THE USER CRITICAL ISSUE REPORT USING THE TRANSMITTED RELEVANT PORTION OF THE CATEGORIZED WELL RATED RECURRING ERROR SOLUTION DATA ON THE USER COMPUTING SYSTEM THROUGH THE SOFTWARE APPLICATION OPERATION 231, the well rated recurring error solution matching the user log error data and user context data of the user critical issue report data of TRANSMIT AN ACTION MESSAGE TO THE USER COMPUTING SYSTEM PROVIDING THE USER ACCESS TO A RELEVANT PORTION OF THE CATEGORIZED WELL RATED RECURRING ERROR SOLUTION DATA REPRESENTING A SOLUTION TO THE MATCHED USER LOG ERROR DATA AND USER CONTEXT DATA OF THE USER CRITICAL ISSUE REPORT OPERATION 229 is implemented on the user computing system using the transmitted relevant portion of the categorized well rated recurring error solution data through the software application.

In one embodiment, the success of the implementation of the well rated recurring error solution matching the user log error data and user context data of the user critical issue report data is monitored via implicit user contribution, i.e., by tracking the steps that the user has taken after they encounter the issue and checking if the user workflow was successful or not. In one embodiment, the success of the implementation of the well rated recurring error solution matching the user log error data and user context data of the user critical issue report data is monitored via explicit user contribution, i.e., based on the user feedback.

In one embodiment, once the well rated recurring error solution matching the user log error data and user context data of the user critical issue report data of TRANSMIT AN ACTION MESSAGE TO THE USER COMPUTING SYSTEM PROVIDING THE USER ACCESS TO A RELEVANT PORTION OF THE CATEGORIZED WELL RATED RECURRING ERROR SOLUTION DATA REPRESENTING A SOLUTION TO THE MATCHED USER LOG ERROR DATA AND USER CONTEXT DATA OF THE USER CRITICAL ISSUE REPORT OPERATION 229 is implemented on the user computing system using the transmitted relevant portion of the categorized well rated recurring error solution data through the software application at IMPLEMENT THE WELL RATED RECURRING ERROR SOLUTION MATCHING THE USER LOG ERROR DATA AND USER CONTEXT DATA OF THE USER CRITICAL ISSUE REPORT USING THE TRANSMITTED RELEVANT PORTION OF THE CATEGORIZED WELL RATED RECURRING ERROR SOLUTION DATA ON THE USER COMPUTING SYSTEM THROUGH THE SOFTWARE APPLICATION OPERATION 231, process flow proceeds to EXIT OPERATION 240.

In one embodiment, at EXIT OPERATION 200 process 200 for dynamically unblocking customers in critical workflows by pushing community contributed solutions just-in-time when an error is encountered is exited to await new data.

In one embodiment, if the obtained user log error data and user context data is determined not to match the error data and context data associated with any well rated solution to the recurring error of the categorized well rated recurring error solution data, an error solution and matching service is used to dynamically generate new recurring error solution data representing a solution to the error indicated in the obtained user log error data and user context data associated with the user critical issue report data. In one embodiment, an action message is then transmitted to the user computing system through the message based action system associated with the software application providing the user access to the new recurring error solution data representing a solution to the error indicated in the obtained user log error data and user context data associated with the user critical issue report data.

In one embodiment, the new recurring error solution data representing a solution to the error indicated in the obtained user log error data and user context data associated with the user critical issue report data is then implemented on the user computing system. In one embodiment, the new recurring error solution data representing a solution to the error indicated in the obtained user log error data and user context data associated with the user critical issue report data according to the user log error data and user context data associated with the user critical issue report data to generate categorized new recurring error solution data. In one embodiment, the categorized new recurring error solution data is then stored for further use when other users encounter the error indicated in the obtained user log error data and user context data associated with the user critical issue report data.

Consequently, returning to MATCH? OPERATION 228, in one embodiment, if at MATCH? OPERATION 228 the obtained user log error data and user context data is determined not to match the error data and context data associated with any well rated solution to the recurring error of the categorized well rated recurring error solution data, process flow proceeds to GOTO OPERATION 329 OF FIG. 3 OPERATION 300.

In one embodiment, process flow proceeds through GOTO OPERATION 329 OF FIG. 3 OPERATION 300 of FIG. 2, to FROM OPERATION 228 OF FIG. 2 OPERATION 301 of FIG. 3 and process flow proceeds to DYNAMICALLY GENERATE NEW RECURRING ERROR SOLUTION DATA REPRESENTING A SOLUTION TO THE ERROR INDICATED IN THE OBTAINED USER LOG ERROR DATA AND USER CONTEXT DATA ASSOCIATED WITH THE USER CRITICAL ISSUE REPORT OPERATION 329.

In one embodiment, at DYNAMICALLY GENERATE NEW RECURRING ERROR SOLUTION DATA REPRESENTING A SOLUTION TO THE ERROR INDICATED IN THE OBTAINED USER LOG ERROR DATA AND USER CONTEXT DATA ASSOCIATED WITH THE USER CRITICAL ISSUE REPORT OPERATION 329, once the obtained user log error data and user context data is determined not to match the error data and context data associated with any well rated solution to the recurring error of the categorized well rated recurring error solution data, an error solution and matching service is used to dynamically generate new recurring error solution data representing a solution to the error indicated in the obtained user log error data and user context data associated with the user critical issue report data.

In one embodiment, once the obtained user log error data and user context data is determined not to match the error data and context data associated with any well rated solution to the recurring error of the categorized well rated recurring error solution data, and an error solution and matching service is used to dynamically generate new recurring error solution data representing a solution to the error indicated in the obtained user log error data and user context data associated with the user critical issue report data at DYNAMICALLY GENERATE NEW RECURRING ERROR SOLUTION DATA REPRESENTING A SOLUTION TO THE ERROR INDICATED IN THE OBTAINED USER LOG ERROR DATA AND USER CONTEXT DATA ASSOCIATED WITH THE USER CRITICAL ISSUE REPORT OPERATION 329, process flow proceeds to TRANSMIT AN ACTION MESSAGE TO THE USER COMPUTING SYSTEM PROVIDING THE USER ACCESS TO THE NEW RECURRING ERROR SOLUTION DATA OPERATION 331.

In one embodiment, at TRANSMIT AN ACTION MESSAGE TO THE USER COMPUTING SYSTEM PROVIDING THE USER ACCESS TO THE NEW RECURRING ERROR SOLUTION DATA OPERATION 331, an action message is transmitted to the user computing system through the message based action system associated with the software application providing the user access to the new recurring error solution data representing a solution to the error indicated in the obtained user log error data and user context data associated with the user critical issue report data.

In one embodiment, once an action message is transmitted to the user computing system through the message based action system associated with the software application providing the user access to the new recurring error solution data representing a solution to the error indicated in the obtained user log error data and user context data associated with the user critical issue report data at TRANSMIT AN ACTION MESSAGE TO THE USER COMPUTING SYSTEM PROVIDING THE USER ACCESS TO THE NEW RECURRING ERROR SOLUTION DATA OPERATION 331, process flow proceeds to IMPLEMENT THE NEW RECURRING ERROR SOLUTION DATA ON THE USER COMPUTING SYSTEM OPERATION 333.

In one embodiment, at IMPLEMENT THE NEW RECURRING ERROR SOLUTION DATA ON THE USER COMPUTING SYSTEM OPERATION 333, the new recurring error solution data representing a solution to the error indicated in the obtained user log error data and user context data associated with the user critical issue report data is implemented on the user computing system.

In one embodiment, once the new recurring error solution data representing a solution to the error indicated in the obtained user log error data and user context data associated with the user critical issue report data is implemented on the user computing system at IMPLEMENT THE NEW RECURRING ERROR SOLUTION DATA ON THE USER COMPUTING SYSTEM OPERATION 333, the success of the new recurring error solution data representing a solution to the error indicated in the obtained user log error data and user context data associated with the user critical issue report data is monitored via implicit user contribution, i.e., by tracking the steps that the user has taken after they encounter the issue and checking if the user workflow was successful or not.

In one embodiment, once the new recurring error solution data representing a solution to the error indicated in the obtained user log error data and user context data associated with the user critical issue report data is then implemented on the user computing system at IMPLEMENT THE NEW RECURRING ERROR SOLUTION DATA ON THE USER COMPUTING SYSTEM OPERATION 333, the success of the new recurring error solution data representing a solution to the error indicated in the obtained user log error data and user context data associated with the user critical issue report data is monitored via explicit user contribution, i.e., based on the user feedback.

In one embodiment, once the new recurring error solution data representing a solution to the error indicated in the obtained user log error data and user context data associated with the user critical issue report data is then implemented on the user computing system at IMPLEMENT THE NEW RECURRING ERROR SOLUTION DATA ON THE USER COMPUTING SYSTEM OPERATION 333, process flow proceeds to CATEGORIZE THE NEW RECURRING ERROR SOLUTION DATA ACCORDING TO THE USER LOG ERROR DATA AND USER CONTEXT DATA ASSOCIATED WITH THE USER CRITICAL ISSUE REPORT DATA OPERATION 335.

In one embodiment, at CATEGORIZE THE NEW RECURRING ERROR SOLUTION DATA ACCORDING TO THE USER LOG ERROR DATA AND USER CONTEXT DATA ASSOCIATED WITH THE USER CRITICAL ISSUE REPORT DATA OPERATION 335 the new recurring error solution data representing a solution to the error indicated in the obtained user log error data and user context data associated with the user critical issue report data is classified according to the user log error data and user context data associated with the user critical issue report data to generate categorized new recurring error solution data.

In one embodiment, once the new recurring error solution data representing a solution to the error indicated in the obtained user log error data and user context data associated with the user critical issue report data is classified according to the user log error data and user context data associated with the user critical issue report data to generate categorized new recurring error solution data at CATEGORIZE THE NEW RECURRING ERROR SOLUTION DATA ACCORDING TO THE USER LOG ERROR DATA AND USER CONTEXT DATA ASSOCIATED WITH THE USER CRITICAL ISSUE REPORT DATA OPERATION 335, the categorized new recurring error solution data is stored for further use when other users encounter the error indicated in the obtained user log error data and user context data associated with the user critical issue report data.

In one embodiment, once the new recurring error solution data representing a solution to the error indicated in the obtained user log error data and user context data associated with the user critical issue report data is classified according to the user log error data and user context data associated with the user critical issue report data to generate categorized new recurring error solution data and the categorized new recurring error solution data is stored for further use when other users encounter the error indicated in the obtained user log error data and user context data associated with the user critical issue report data at CATEGORIZE THE NEW RECURRING ERROR SOLUTION DATA ACCORDING TO THE USER LOG ERROR DATA AND USER CONTEXT DATA ASSOCIATED WITH THE USER CRITICAL ISSUE REPORT DATA OPERATION 335, process flow proceeds to TO EXIT OPERATION 240 OF FIG. 2 OPERATION 337.

In one embodiment, at TO EXIT OPERATION 240 OF FIG. 2 OPERATION 337, process flow proceeds through TO EXIT OPERATION 240 OF FIG. 2 OPERATION 337 of FIG. 3 to FROM OPERATION 337 OF FIG. 3 OPERATION 239 OF FIG. 2 and process flow proceeds to EXIT OPERATION 240.

In one embodiment, at EXIT OPERATION 200 process 200 for dynamically unblocking customers in critical workflows by pushing community contributed solutions just-in-time when an error is encountered is exited to await new data.

Process 200 for dynamically unblocking customers in critical workflows by pushing community contributed solutions just-in-time when an error is encountered, as disclosed herein, provides the ability to message a specific user or group of users based on specific condition(s) checks. In addition, process 200 for dynamically unblocking customers in critical workflows by pushing community contributed solutions just-in-time when an error is encountered provides the ability to trigger upgrade flow when a specific condition is met.

Process 200 for dynamically unblocking customers in critical workflows by pushing community contributed solutions just-in-time when an error is encountered provides the ability to send messages through notifications/action messages to trigger actions based on a condition. In addition, process 200 for dynamically unblocking customers in critical workflows by pushing community contributed solutions just-in-time when an error is encountered provides the ability to detect a specific error scenario and request the user to send the error log data and/or context data, or automatically obtain the error log data and/or context data, to help in the investigation of the error/critical issue.

Process 200 for dynamically unblocking customers in critical workflows by pushing community contributed solutions just-in-time when an error is encountered provides the ability to turn on enhanced logging for a set of specific users, normally after user permission is obtained, to debug a critical issue/error. In addition, process 200 for dynamically unblocking customers in critical workflows by pushing community contributed solutions just-in-time when an error is encountered provides the ability to turn on enhanced logging for a specific user set, with the users' permission, to debug an issue.

In addition, process 200 for dynamically unblocking customers in critical workflows by pushing community contributed solutions just-in-time when an error is encountered provides for a generic expression evaluator that can unblock users and open up possibilities to dynamically control errors/app behavior without a need for a code change.

Process 200 for dynamically unblocking customers in critical workflows by pushing community contributed solutions just-in-time when an error is encountered provides for unblocking customers/users of a software application without a need for applying a data fix or releasing a patch or new application version, in the interim, until a long-term solution can be formulated and implemented. Therefore, process 200 for dynamically unblocking customers in critical workflows by pushing community contributed solutions just-in-time when an error is encountered solves the long standing technical problem in the workflow application environment of users of a software application getting stuck and blocked from making progress with their workflows due to system, setup, data synchronization, and/or other critical issues, without applying a data fix or releasing a patch or new application version until a long-term solution can be formulated and implemented.

Process 200 for dynamically unblocking customers in critical workflows by pushing community contributed solutions just-in-time when an error is encountered does not encompass, embody, or preclude other forms of innovation in the area of distributed workflow applications. In addition, process 200 for dynamically unblocking customers in critical workflows by pushing community contributed solutions just-in-time when an error is encountered is not related to any fundamental economic practice, mental steps, or pen and paper based solution, and is in fact directed to providing solutions to the relatively new problems associated with distributed workflow applications. Consequently, process 200 for dynamically unblocking customers in critical workflows by pushing community contributed solutions just-in-time when an error is encountered is not directed to, does not encompass, and is not merely, an abstract idea or concept.

In addition, process 200 for dynamically unblocking customers in critical workflows by pushing community contributed solutions just-in-time when an error is encountered provides for significant improvements to the technical fields of customer support, information dissemination, software implementation, and user experience, data processing, data management, distributed workflow applications, client server applications, and real time application fixes.

In addition process 200 for dynamically unblocking customers in critical workflows by pushing community contributed solutions just-in-time when an error is encountered provides for the processing of only relevant portions of data and data analysis before the data is further analyzed, processed and/or transmitted or distributed. Consequently, using process 200 for dynamically unblocking customers in critical workflows by pushing community contributed solutions just-in-time when an error is encountered results in more efficient use of human and non-human resources, fewer processor cycles being utilized, reduced memory utilization, and less communications bandwidth being utilized to relay data to and from backend systems and client systems. As a result, computing systems are transformed into faster, more efficient, and more effective computing systems by implementing process 200 for dynamically unblocking customers in critical workflows by pushing community contributed solutions just-in-time when an error is encountered.

Figure 4:
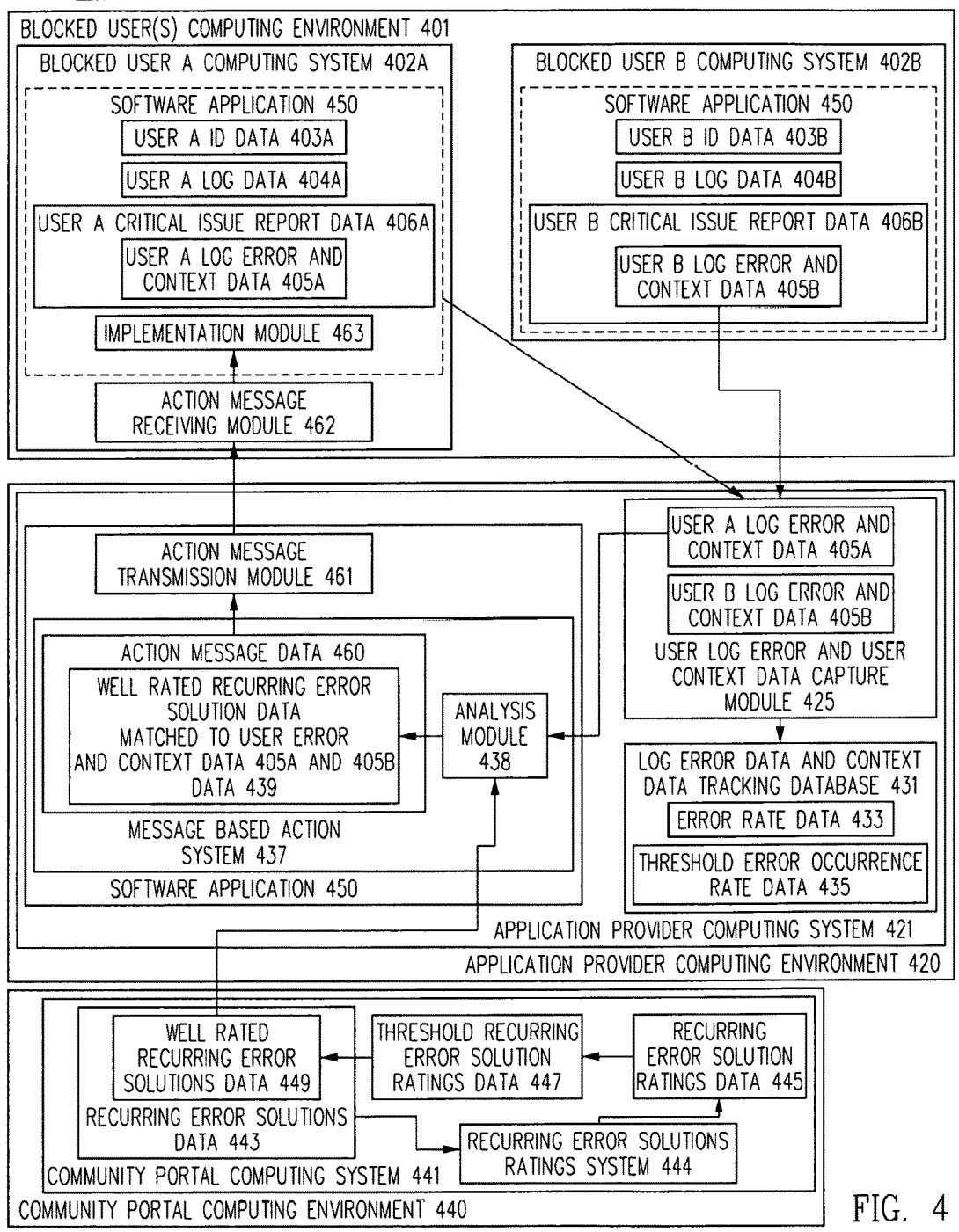
FIG. 4 is a block diagram of a hardware and production environment for providing a process for dynamically unblocking customers in critical workflows by pushing community contributed solutions just-in-time when an error is encountered, in accordance with one embodiment.

FIG. 4 is a block diagram of a hardware and production environment 400 for providing a process for dynamically unblocking customers in critical workflows by pushing community contributed solutions just-in-time when an error is encountered, in accordance with one embodiment.

As seen in FIG. 4, in this specific illustrative example, production environment 400 includes: blocked user (s) computing environment 401, including blocked user A computing system 402A and blocked user B computing system 402B; application provider computing environment 420, including application provider computing system 421 providing software application 450, user log error and user context data capture module 425, and log error data and context data tracking database 431; and community portal computing environment 440 including community portal computing system 441.

In various embodiments, blocked user (s) computing environment 401, application provider computing environment 420, and community portal computing environment 440, are any computing environments as discussed herein, and/or as known in the art at the time of filing, and/or as developed after the time of filing. In various embodiments, blocked user (s) computing environment 401, application provider computing environment 420, and community portal computing environment 440 can be combined, or further divided, into fewer, or more, computing environments.

As seen in FIG. 4, in this specific illustrative example, blocked user computing system 402A, associated with a first blocked user of software application 450, and blocked user computing system 402B, associated with a second blocked user of software application 450 are operating in blocked user (s) computing environment 401.

As also seen in FIG. 4, in this specific illustrative example, blocked user computing system 402A includes, and implements, at least part of software application 450, likewise blocked user computing system 402B includes, and implements, at least part of software application 450. In this specific illustrative example, software application 450 obtains/includes user A ID data 403A and user A log data 404A. Likewise, in this specific illustrative example, blocked user computing system 402B includes, and implements, at least part of software application 450. In this specific illustrative example, software application 450 obtains/includes user B ID data 403B and user B log data 404B.

As also seen in FIG. 4, in this specific illustrative example, software application 450 includes user A critical report data 406A that is generated when user A encounters any of the critical issues discussed herein. As also seen in FIG. 4, in this specific illustrative example, user A critical report data 406A includes user A log error and context data 405A. Likewise, in this specific illustrative example, software application 450 includes user B critical report data 406B that is generated when user B encounters any of the critical issues discussed herein and that includes user B log error and context data 405B.

In this specific illustrative example, when user A encounters any of the critical issues discussed herein, user A critical report data 406A is obtained by user log error and user context data capture module 425 and user A log error and context data 405A is captured/extracted by user log error and user context data capture module 425. Likewise, in this specific illustrative example, when user B encounters any of the critical issues discussed herein, user B critical report data 406B is obtained by user log error and user context data capture module 425 and user B log error and context data 405B is captured/extracted by user log error and user context data capture module 425.

In one embodiment, log error data and context tracking database 431 then determines the error rate data 433 associated with the particular critical issue of user A log error and context data 405A and user B log error and context data 405B. In this specific illustrative example, error rate data 433 is compared to threshold error occurrence rate data 435 and if the error occurrence rate indicated by error rate data 433 is greater than the error occurrence rate represented by threshold error occurrence rate data 435, the error associated with user A log error and context data 405A and user B log error and context data 405B is designated a recurring error.

In this specific illustrative example, once the error associated with user A log error and context data 405A and user B log error and context data 405B is designated a recurring error, recurring error solutions data 443, representing solutions to the recurring error associated with user A log error and context data 405A and user B log error and context data 405B, is solicited/obtained from one or more sources of recurring error solutions data 443 (not shown) through community portal computing system, 441.

In this specific illustrative example, the solutions to the recurring error associated with user A log error and context data 405A and user B log error and context data 405B represented by recurring error solutions data 443 are rated using recurring error solutions rating system 444 to generate recurring error solution ratings data 445 for a recurring error solution of recurring error solutions data 443. In one embodiment, the recurring error solution ratings data 445 for a recurring error solution of recurring error solutions data 443 is then compared to threshold recurring error solution ratings data 447 and if the rating for the recurring error solution of recurring error solutions data 443 represented by recurring error solution ratings data 445 is greater than the rating represented by threshold recurring error solution ratings data 447, the recurring error solution of recurring error solutions data 443 is designated well rated recurring error solution data and added to well rated recurring error solution data 449.

As seen in FIG. 4, in this specific illustrative example, user A log error and context data 405A and user B log error and context data 405B are provided to analysis module 438 of message based action system 437. In addition, in this specific illustrative example, well rated recurring error solution data 449 is also provided to analysis module 438 of message based action system 437.

In one embodiment, analysis module 438 analyzes user A log error and context data 405A and user B log error and context data 405B and well rated recurring error solution data 449 to determine if any of the solutions represented by well rated recurring error solution data 449 have error data and context data that match user A log error and context data 405A and/or user B log error and context data 405B. In this specific illustrative example, it is postulated that user A log error and context data 405A and user B log error and context data 405B match a portion of well rated recurring error solution data 449 represented by well rated recurring error solution data matched to user log error and context data 405A and 405B data 439.

Consequently, in this specific illustrative example, well rated recurring error solution data matched to user log error and context data 405A and 405B data 439 is included in, and/or used to generate, action message data 460. In this specific illustrative example, action message data 460 is then transmitted to action message receiving module 462 of blocked user A computing system 402A by action message transmission module 461.

In this specific illustrative example, implementation module 463 of software application 450 on blocked user A computing system 402A is used to implement the solution represented by well rated recurring error solution data matched to user log error and context data 405A and 405B data 439 of action message data 460 through software application 450 on blocked user A computing system 402A.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "designating," "categorizing," "receiving," "transmitting," "implementing," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for dynamically unblocking customers in critical workflows by pushing community contributed solutions just-in-time when an error is encountered, the method comprising:

providing, by an application provider computing system, a software application to a user using a user computing systems, and implementing, by a user computing system, at least a portion of the provided software application;

providing, by the application provider computing system, a message based action system as a component of the software application, the message based action system configured to provide action messages through the software application to user computing systems implementing at least part of the software application;

providing, by a community portal computing environment, a community portal for the software application using one or more computing systems through which recurring error solution data representing solutions to recurring errors encountered by users of the software application is obtained;

automatically tracking steps that a user takes to correct an error and checking whether the steps resulted in a successful solution to the error, storing successful solutions in a solutions database provided for the purpose;

generating threshold error occurrence rate data representing a threshold error occurrence rate such that if an error occurs more than the threshold error occurrence rate, the error is designated a recurring error;

automatically updating, upon determination that an error occurs more than then threshold error occurrence rate, the community portal, to allow recurring error solution data representing solutions to the recurring error to be obtained and/or posted;

providing a recurring error solutions ratings system using one or more computing systems through which the recurring error solution data representing solutions to recurring errors obtained and/or posted in the community portal for the software application are rated and associated recurring error solution ratings data is generated;

generating threshold recurring error solution ratings data representing a defined threshold recurring error solution rating such that if recurring error solution data representing a solution to a recurring error obtained and/or posted in the community portal for the software application has associated recurring error solution ratings data representing a recurring error solution rating for the recurring error solution data greater than the threshold recurring error solution rating represented by the threshold recurring error solution ratings data, the recurring error solution data is designated well rated recurring error solution data representing a well rated solution to the recurring error;

categorizing all well rated recurring error solution data according to error data and context data associated with the recurring error that is the subject of the well rated recurring error solution data to generate categorized well rated recurring error solution data;

storing the categorized well rated recurring error solution data;

receiving, from the user computing system of the user, user critical issue report data indicating a first user has encountered an access issue or other critical issue, the access issue or other critical issue blocking the first user from progressing with the software application;

automatically obtaining user log error data and user context data associated with the user critical issue report data from the user computing system associated with the user of the software application;

storing the user log error data and user context data in a log error data and context data tracking database;

analyzing the obtained user log error data and user context data and determining that the obtained user log error data and user context data matches error data and context data of at least one of the categorized well rated recurring error solution data representing well rated solutions to recurring errors;

pushing an action message to the user computing system through the message based action system associated with the software application, the action message representing a solution to the access issue or other critical issue blocking the first user from progressing; and automatically implementing, through the software application, the solution to the access issue or other critical issue on the user computing system.

2. The method for dynamically unblocking customers in critical workflows by pushing community contributed solutions just-in-time when an error is encountered of claim 1 wherein software application is provided to one or more users via a workflow application framework.

3. The method for dynamically unblocking customers in critical workflows by pushing community contributed solutions just-in-time when an error is encountered of claim 1 wherein message based action system associated with the software application utilizes action messages including the following attributes:
condition for the action;
context; and
action.

4. The method for dynamically unblocking customers in critical workflows by pushing community contributed solutions just-in-time when an error is encountered of claim 3 wherein the context action message attribute includes one or more of the following contexts:
very early on in the software application initialization;
when an entity parsing error happens during sync including an error code representing the specific entity parse error and/or an entity name that has the parse error;
when a batch request contains a fault item executed for each fault response item including an error code a server and/or an error message from a server;
once for each activity start including the name of the activity;
once a foreground sync is completed;
whenever homepage is shown;
the first time a new version is launched;
the first time after an upgraded software application is launched;
when errors are logged; and
when information is logged.

5. The method for dynamically unblocking customers in critical workflows by pushing community contributed solutions just-in-time when an error is encountered of claim 4 wherein the context action message attribute includes one or more of:
appstart;
syncparseerror, including syncerrorcode and/or syncerrorentity;
syncerror including syncerrorcode and/or syncerrormessage;
activitystart including activityname;
synccomplete;
homepage;
new version;
afterupgrade;
logerror including logmessage; and
loginfo including logmessage.

6. The method for dynamically unblocking customers in critical workflows by pushing community contributed solutions just-in-time when an error is encountered of claim 3 wherein the each of the action attributes includes one or more of a name of the action field, a one-time only indicator field, and an action specific JSON as a string field.

7. The method for dynamically unblocking customers in critical workflows by pushing community contributed solutions just-in-time when an error is encountered of claim 3 wherein the action attributes of the action message include one or more of:
an action directing the user and/or user computing system to the well rated recurring error solution matching the user log error data and user context data of the user critical issue report data in the community portal;
an action that shows an alert dialog with ok and cancel buttons;
an action that needs to be executed when the user clicks an ok button;
an action that needs to be executed when the user clicks a cancel button;
an action that triggers a full synchronization;
an action that that skips a specific synchronization error;
an action that logs synchronization error details including the JSON response;
an action that takes the user to the software application upgrade flow; and
an action that dynamically adds an action message to be executed at a later time and/or event.

8. The method for dynamically unblocking customers in critical workflows by pushing community contributed solutions just-in-time when an error is encountered of claim 3 wherein message based action system associated with the software application utilizes action messages of the format [{context:" . . . ",condition:" . . . ",actions:[{name:" . . . ", otm: True or False, actionJson:NULL/ . . . }]}].

9. A system for dynamically unblocking customers in critical workflows by pushing community contributed solutions just-in-time when an error is encountered comprising:
an application provider computing system providing a software application to one or more users of the software application, the software application configured to automatically track steps that a user takes to correct an error and checking whether the steps resulted in a successful solution to the error, storing successful solutions in a solutions database provided for the purpose;
providing, by the application provider computing system, a message based action system as a component of the software application, the message based action system configured to provide action messages through the software application to user computing systems implementing at least part of the software application;

one or more computing systems providing a community portal for the software application, the community portal for obtaining and/or posting recurring error solution data representing solutions to recurring errors encountered by users of the software application;

threshold error occurrence rate data representing a threshold error occurrence rate such that if an error occurs more than the threshold error occurrence rate, the error is designated a recurring error;

automatically updating, upon determination that an error occurs more than the threshold error occurrence rate, the community portal, to allow recurring error solution data representing solutions to the recurring error to be obtained and/or posted;

one or more computing systems providing a recurring error solutions ratings system through which the recurring error solution data representing solutions to recurring errors obtained and/or posted in the community portal for the software application are rated and associated recurring error solution ratings data is generated;

threshold recurring error solution ratings data representing a defined threshold recurring error solution rating such that if recurring error solution data representing a solution to a recurring error obtained and/or posted in the community portal for the software application has associated recurring error solution ratings data representing a recurring error solution rating for the recurring error solution data greater than the threshold recurring error solution rating represented by the threshold recurring error solution ratings data, the recurring error solution data is designated well rated recurring error solution data representing a well rated solution to the recurring error;

one or more processors for categorizing all well rated recurring error solution data according to error data and context data associated with the recurring error that is the subject of the well rated recurring error solution data and generating categorized well rated recurring error solution data;

a memory storing the categorized well rated recurring error solution data;

a critical issue report data receiving module of the software application for receiving user critical issue report data from a user of the software application indicating the user has encountered an access issue or other critical issue, the access issue or other critical issue blocking the first user from progressing with the software application;

a user log error data and user context data capture module of the software application for obtaining user log error data and user context data associated with the user critical issue report data from a user computing system associated with the user of the software application;

a log error data and context data tracking database storing the user log error data and user context data;

an analysis module of the software application for analyzing the obtained user log error data and user context data to determine that the obtained user log error data and user context data matches the error data and context data associated with at least one of the categorized well rated recurring error solution data representing well rated solutions to recurring errors;

a recurring error solution transmission module of the software application for pushing an action message to the user computing system through the message based action system associated with the software application, the action message providing the user categorized well rated recurring error solution data representing a solution to the matched user log error data and user context data of the user critical issue report data;

a recurring error solution receiving module of the software application for receiving the action message at the user computing system; and one or more user computing system processors for automatically implementing the solution to the access issue or other critical issue blocking the first user from progressing the implemented solution being represented by the well rated recurring error solution matching the user log error data and user context data of the user critical issue report data on the user computing system.

10. The system for dynamically unblocking customers in critical workflows by pushing community contributed solutions just-in-time when an error is encountered of claim 9 wherein software application is provided to one or more users via a workflow application framework.

11. The system for dynamically unblocking customers in critical workflows by pushing community contributed solutions just-in-time when an error is encountered of claim 9 wherein message based action system associated with the software application utilizes action messages including the following attributes:
condition for the action;
context; and
action.

12. The system for dynamically unblocking customers in critical workflows by pushing community contributed solutions just-in-time when an error is encountered of claim 11 wherein the context action message attribute includes one or more of the following contexts:
very early on in the software application initialization;
when an entity parsing error happens during sync including an error code representing the specific entity parse error and/or an entity name that has the parse error;
when a batch request contains a fault item executed for each fault response item including an error code a server and/or an error message from a server;
once for each activity start including the name of the activity;
once a foreground sync is completed;
whenever homepage is shown;
the first time a new version is launched;
the first time after an upgraded software application is launched;
when errors are logged; and
when information is logged.

13. The system for dynamically unblocking customers in critical workflows by pushing community contributed solutions just-in-time when an error is encountered of claim 12 wherein the context action message attribute includes one or more of:
appstart;
syncparseerror, including syncerrorcode and/or syncerrorentity;
syncerror including syncerrorcode and/or syncerrormessage;
activitystart including activityname;
synccomplete;
homepage;
new version;
afterupgrade;
logerror including logmessage; and
loginfo including logmessage.

14. The system for dynamically unblocking customers in critical workflows by pushing community contributed solutions just-in-time when an error is encountered of claim 11 wherein the each of the action attributes includes one or more of a name of the action field, a one-time only indicator field, and an action specific JSON as a string field.

15. The system for dynamically unblocking customers in critical workflows by pushing community contributed solutions just-in-time when an error is encountered of claim 11 wherein the action attributes of the action message include one or more of:
   an action directing the user and/or user computing system to the well rated recurring error solution matching the user log error data and user context data of the user critical issue report data in the community portal;
   an action that shows an alert dialog with ok and cancel buttons;
   an action that needs to be executed when the user clicks an ok button;
   an action that needs to be executed when the user clicks a cancel button;
   an action that triggers a full synchronization;
   an action that that skips a specific synchronization error;
   an action that logs synchronization error details including the JSON response;
   an action that takes the user to the software application upgrade flow; and
   an action that dynamically adds an action message to be executed at a later time and/or event.

16. The system for dynamically unblocking customers in critical workflows by pushing community contributed solutions just-in-time when an error is encountered of claim 11 wherein message based action system associated with the software application utilizes action messages of the format [{context:" . . . ",condition:" . . . ",actions:[{name:" . . . ", otm: True or False, actionJson:NULL/ . . . }]}].

17. A method for dynamically unblocking customers in critical workflows by pushing community contributed solutions just-in-time when an error is encountered, the method comprising:
   providing, by an application provider computing system, a software application to one or more users using one or more computing systems;
   providing, by the application provider computing system, a message based action system associated with the software application using one or more computing systems, the message based action system for providing action messages through the software application to user computing systems implementing at least part of the software application;
   providing, by a community portal computing environment, a community portal for the software application using one or more computing systems through which recurring error solution data representing solutions to recurring errors encountered by users of the software application is obtained and/or posted;
   automatically tracking steps that a user takes to correct an error and checking whether the steps resulted in a successful solution to the error, storing successful solutions in a solutions database provided for the purpose;
   generating threshold error occurrence rate data representing a threshold error occurrence rate such that if an error occurs more than the threshold error occurrence rate, the error is designated a recurring error and the community portal for the software application is updated to allow recurring error solution data representing solutions to the recurring error to be obtained and/or posted;
   providing a recurring error solutions ratings system using one or more computing systems through which the recurring error solution data representing solutions to recurring errors obtained and/or posted in the community portal for the software application are rated and associated recurring error solution ratings data is generated;
   generating threshold recurring error solution ratings data representing a defined threshold recurring error solution rating such that if recurring error solution data representing a solution to a recurring error obtained and/or posted in the community portal for the software application has associated recurring error solution ratings data representing a recurring error solution rating for the recurring error solution data greater than the threshold recurring error solution rating represented by the threshold recurring error solution ratings data, the recurring error solution data is designated well rated recurring error solution data representing a well rated solution to the recurring error;
   categorizing all well rated recurring error solution data according to error data and context data associated with the recurring error that is the subject of the well rated recurring error solution data to generate categorized well rated recurring error solution data;
   storing the categorized well rated recurring error solution data;
   receiving, from a user computing system of the user, user critical issue report data from a user of the software application indicating the user has encountered an access issue or other critical issue, the access issue or other critical issue blocking the user from progressing with the software application;
   automatically obtaining user log error data and user context data associated with the user critical issue report data from a user computing system associated with the user of the software application;
   storing the user log error data and user context data in a log error data and context data tracking database;
   analyzing the obtained user log error data and user context data and determining that the obtained user log error data and user context data matches the error data and context data associated with at least one of the categorized well rated recurring error solution data representing well rated solutions to recurring errors;
   dynamically generating new recurring error solution data representing a solution to the error indicated in the obtained user log error data and user context data associated with the user critical issue report data;
   pushing an action message to the user computing system through the message based action system associated with the software application, the action message providing the user access to the new recurring error solution data representing a solution to the error indicated in the obtained user log error data and user context data associated with the user critical issue report data;
   automatically implementing, through the software application, the new recurring error solution data representing a solution to the error indicated in the obtained user log error data and user context data associated with the user critical issue report data on the user computing system;

categorizing the new recurring error solution data representing a solution to the error indicated in the obtained user log error data and user context data associated with the user critical issue report data according to the user log error data and user context data associated with the user critical issue report data to generate categorized new recurring error solution data; and storing the categorized new recurring error solution data.

18. The method for dynamically unblocking customers in critical workflows by pushing community contributed solutions just-in-time when an error is encountered of claim 17 wherein software application is provided to one or more users via a workflow application framework.

19. The method for dynamically unblocking customers in critical workflows by pushing community contributed solutions just-in-time when an error is encountered of claim 18 wherein message based action system associated with the software application utilizes action messages including the following attributes:
  condition for the action;
  context; and
  action.

20. The method for dynamically unblocking customers in critical workflows by pushing community contributed solutions just-in-time when an error is encountered of claim 19 wherein the context action message attribute includes one or more of the following contexts:
  very early on in the software application initialization;
  when an entity parsing error happens during sync including an error code representing the specific entity parse error and/or an entity name that has the parse error;
  when a batch request contains a fault item executed for each fault response item including an error code a server and/or an error message from a server;
  once for each activity start including the name of the activity;
  once a foreground sync is completed;
  whenever homepage is shown;
  the first time a new version is launched;
  the first time after an upgraded software application is launched;
  when errors are logged; and
  when information is logged.

21. The method for dynamically unblocking customers in critical workflows by pushing community contributed solutions just-in-time when an error is encountered of claim 19 wherein the each of the action attributes includes one or more of a name of the action field, a one-time only indicator field, and an action specific JSON as a string field.

22. The method for dynamically unblocking customers in critical workflows by pushing community contributed solutions just-in-time when an error is encountered of claim 19 wherein the action attributes of the action message include one or more of:
  an action directing the user and/or user computing system to the well rated recurring error solution matching the user log error data and user context data of the user critical issue report data and/or the new recurring error solution matching the user log error data and user context data of the user critical issue report data in the community portal;
  an action that shows an alert dialog with ok and cancel buttons;
  an action that needs to be executed when the user clicks an ok button;
  an action that needs to be executed when the user clicks a cancel button;
  an action that triggers a full synchronization;
  an action that that skips a specific synchronization error;
  an action that logs synchronization error details including the JSON response;
  an action that takes the user to the software application upgrade flow; and
  an action that dynamically adds an action message to be executed at a later time and/or event.

23. A system for dynamically unblocking customers in critical workflows by pushing community contributed solutions just-in-time when an error is encountered comprising:
  an application provider computing system providing a software application to one or more users of the software application;
  providing, by the application provider computing system, a message based action system associated with the software application, the message based action system for providing action messages through the software application to user computing systems implementing at least part of the software application;
  one or more computing systems providing a community portal for the software application, the community portal obtaining and/or posting recurring error solution data representing solutions to recurring errors encountered by users of the software application;
  threshold error occurrence rate data representing a threshold error occurrence rate such that if an error occurs more than the threshold error occurrence rate, the error is designated a recurring error and the community portal for the software application is updated to allow recurring error solution data representing solutions to the recurring error to be obtained and/or posted;
  one or more computing systems providing a recurring error solutions ratings system through which the recurring error solution data representing solutions to recurring errors obtained and/or posted in the community portal for the software application are rated and associated recurring error solution ratings data is generated;
  threshold recurring error solution ratings data representing a defined threshold recurring error solution rating such that if recurring error solution data representing a solution to a recurring error obtained and/or posted in the community portal for the software application has associated recurring error solution ratings data representing a recurring error solution rating for the recurring error solution data greater than the threshold recurring error solution rating represented by the threshold recurring error solution ratings data, the recurring error solution data is designated well rated recurring error solution data representing a well rated solution to the recurring error;
  one or more processors for categorizing all well rated recurring error solution data according to error data and context data associated with the recurring error that is the subject of the well rated recurring error solution data and generating categorized well rated recurring error solution data;
  a memory storing the categorized well rated recurring error solution data;
  a critical issue report data receiving module of the software application for receiving user critical issue report data from a user of the software application indicating the user has encountered an access issue or other critical issue, the access issue or other critical issue blocking the user from progressing with the software application;

a user log error data and user context data capture module of the software application for obtaining user log error data and user context data associated with the user critical issue report data from a user computing system associated with the user of the software application;

a log error data and context data tracking database storing the user log error data and user context data;

an analysis module of the software application for analyzing the obtained user log error data and user context data to determine that the obtained user log error data and user context data matches the error data and context data associated with at least one of the categorized well rated recurring error solution data representing well rated solutions to recurring errors;

a new recurring error solution system for dynamically generating new recurring error solution data representing a solution to the error indicated in the obtained user log error data and user context data associated with the user critical issue report data;

a new recurring error solution transmission module for pushing an action message to a computing system associated with the user through the message based action system associated with the software application, the action message providing the user access to the new recurring error solution data representing a solution to the error indicated in the obtained user log error data and user context data associated with the user critical issue report data;

a new recurring error solution receiving module for receiving the action message at the computing system associated with the user through the message based action system associated with the software application;

one or more user computing system processors for automatically implementing the new recurring error solution data representing a solution to the error indicated in the obtained user log error data and user context data associated with the user critical issue report data on the user computing system;

one or more processors for categorizing the new recurring error solution data representing a solution to the error indicated in the obtained user log error data and user context data associated with the user critical issue report data according to the user log error data and user context data associated with the user critical issue report data to generate categorized new recurring error solution data; and a memory storing the categorized new recurring error solution data.

24. The system for dynamically unblocking customers in critical workflows by pushing community contributed solutions just-in-time when an error is encountered of claim 23 wherein software application is provided to one or more users via a workflow application framework.

25. The system for dynamically unblocking customers in critical workflows by pushing community contributed solutions just-in-time when an error is encountered of claim 23 wherein message based action system associated with the software application utilizes action messages including the following attributes:

condition for the action;

context; and action.

26. The system for dynamically unblocking customers in critical workflows by pushing community contributed solutions just-in-time when an error is encountered of claim 25 wherein the context action message attribute includes one or more of the following contexts:

very early on in the software application initialization;

when an entity parsing error happens during sync including an error code representing the specific entity parse error and/or an entity name that has the parse error;

when a batch request contains a fault item executed for each fault response item including an error code a server and/or an error message from a server;

once for each activity start including the name of the activity;

once a foreground sync is completed;

whenever homepage is shown;

the first time a new version is launched;

the first time after an upgraded software application is launched;

when errors are logged; and when information is logged.

27. The system for dynamically unblocking customers in critical workflows by pushing community contributed solutions just-in-time when an error is encountered of claim 25 wherein the each of the action attributes includes one or more of a name of the action field, a one-time only indicator field, and an action specific JSON as a string field.

28. The system for dynamically unblocking customers in critical workflows by pushing community contributed solutions just-in-time when an error is encountered of claim 25 wherein the action attributes of the action message include one or more of:

an action directing the user and/or user computing system to the well rated recurring error solution matching the user log error data and user context data of the user critical issue report data and/or the new recurring error solution matching the user log error data and user context data of the user critical issue report data in the community portal;

an action that shows an alert dialog with ok and cancel buttons;

an action that needs to be executed when the user clicks an ok button;

an action that needs to be executed when the user clicks a cancel button;

an action that triggers a full synchronization;

an action that that skips a specific synchronization error;

an action that logs synchronization error details including the JSON response;

an action that takes the user to the software application upgrade flow; and an action that dynamically adds an action message to be executed at a later time and/or event.

* * * * *